US011996731B2

(12) United States Patent
Saito et al.

(10) Patent No.: US 11,996,731 B2
(45) Date of Patent: May 28, 2024

(54) CORE, STATOR, AND ROTATING ELECTRIC DEVICE

(71) Applicants: Sumitomo Electric Industries, Ltd., Osaka (JP); Sumitomo Electric Sintered Alloy, Ltd., Takahashi (JP)

(72) Inventors: Tatsuya Saito, Osaka (JP); Tomoyuki Ueno, Osaka (JP); Hijiri Tsuruta, Takahashi (JP); Yuichi Nakamura, Osaka (JP); Yuka Fukunaga, Osaka (JP)

(73) Assignees: SUMITOMO ELECTRIC INDUSTRIES, LTD., Osaka (JP); SUMITOMO ELECTRIC SINTERED ALLOY, LTD., Takahashi (JP)

( * ) Notice: Subject to any disclaimer, the term of this patent is extended or adjusted under 35 U.S.C. 154(b) by 652 days.

(21) Appl. No.: 17/285,476

(22) PCT Filed: Sep. 5, 2019

(86) PCT No.: PCT/JP2019/035080
§ 371 (c)(1),
(2) Date: Apr. 15, 2021

(87) PCT Pub. No.: WO2020/084926
PCT Pub. Date: Apr. 30, 2020

(65) Prior Publication Data
US 2022/0014050 A1    Jan. 13, 2022

(30) Foreign Application Priority Data

Oct. 26, 2018   (JP) ................................ 2018-202373

(51) Int. Cl.
*H02K 1/14*    (2006.01)
*H02K 1/02*    (2006.01)
(Continued)

(52) U.S. Cl.
CPC ............... *H02K 1/146* (2013.01); *H02K 1/02* (2013.01); *H02K 3/22* (2013.01); *H02K 21/24* (2013.01); *H02K 1/14* (2013.01); *H02K 3/522* (2013.01)

(58) Field of Classification Search
CPC ........... H02K 1/146; H02K 1/14; H02K 3/522
See application file for complete search history.

(56) References Cited

U.S. PATENT DOCUMENTS

2008/0174202 A1* 7/2008 Tatematsu ............ H02K 15/022
310/402
2009/0127970 A1* 5/2009 Tatematsu ............ H02K 15/022
310/216.067

(Continued)

FOREIGN PATENT DOCUMENTS

JP    2006-14436 A    1/2006
JP    2009-044941 A   2/2009
(Continued)

OTHER PUBLICATIONS

International Search Report and Written Opinion dated Nov. 19, 2019, received for PCT Application PCT/JP2019/035080, Filed on Sep. 5, 2019, 8 pages including English Translation.

Primary Examiner — Gary A Nash
(74) Attorney, Agent, or Firm — XSENSUS LLP

(57) ABSTRACT

A core used in an axial-gap rotating electric device includes an annular back yoke and a plurality of teeth protruding in an axial direction that is perpendicular to a first flat surface of the back yoke. The plurality of teeth are provided on the first flat surface at intervals in a circumferential direction. The back yoke and the teeth are constituted of an integrally-molded powder compact. A first curved section that connects a peripheral surface of each tooth and the first flat surface of the back yoke is provided at a corner between the tooth and (Continued)

the back yoke. The first curved section has a curvature radius ranging between 0.2 mm and 1.5 mm inclusive.

13 Claims, 13 Drawing Sheets

(51) Int. Cl.
*H02K 3/22* (2006.01)
*H02K 3/52* (2006.01)
*H02K 21/24* (2006.01)

(56) References Cited

U.S. PATENT DOCUMENTS

| | | | |
|---|---|---|---|
| 2013/0276296 A1* | 10/2013 | Tanahashi | H02K 15/066 |
| | | | 29/596 |
| 2014/0009022 A1* | 1/2014 | Kim | H02K 21/145 |
| | | | 310/114 |
| 2018/0248419 A1* | 8/2018 | Nigo | H02K 1/02 |
| 2019/0214860 A1 | 7/2019 | Igarashi et al. | |

FOREIGN PATENT DOCUMENTS

| | | |
|---|---|---|
| JP | 2009-142095 A | 6/2009 |
| JP | 2011-30334 A | 2/2011 |
| JP | 2013-17312 A | 1/2013 |
| JP | 2017-229191 A | 12/2017 |

\* cited by examiner ated herein

CORE, STATOR, AND ROTATING ELECTRIC DEVICE

CROSS-REFERENCE TO RELATED APPLICATIONS

The present application is based on PCT filing PCT/JP2019/035080, filed Sep. 5, 2019, which claims priority to Japanese Patent Application No. 2018-202373, filed on Oct. 26, 2018, the entire contents of each are incorporated herein by reference.

TECHNICAL FIELD

The present disclosure relates to cores, stators, and rotating electric devices.

BACKGROUND ART

Patent Literatures 1 and 2 disclose an axial-gap motor (rotating electric device) in which a rotor and a stator are disposed facing each other in the axial direction. The stator used in the rotating electric device of this type includes an annular back yoke, a core having a plurality of teeth protruding in the axial direction from the back yoke, and a coil disposed around each tooth. The plurality of teeth are provided on one surface (upper surface) of the back yoke at intervals in the circumferential direction.

In Patent Literature 1, the core is constituted of a molded powder compact obtained by integrally molding the back yoke and the teeth.

CITATION LIST

Patent Literature

PTL 1: Japanese Unexamined Patent Application Publication No. 2009-142095
PTL 2: Japanese Unexamined Patent Application Publication No. 2017-229191

SUMMARY OF INVENTION

A core according to the present disclosure is a core used in an axial-gap rotating electric device and includes an annular back yoke and a plurality of teeth protruding in an axial direction that is perpendicular to a first flat surface of the back yoke. The plurality of teeth are provided on the first flat surface at intervals in a circumferential direction. The back yoke and the teeth are constituted of an integrally-molded powder compact. A first curved section that connects a peripheral surface of each tooth and the first flat surface of the back yoke is provided at a corner between the tooth and the back yoke. The first curved section has a curvature radius ranging between 0.2 mm and 1.5 mm inclusive.

A stator according to the present disclosure is a stator in an axial-gap rotating electric device and includes the core according to the present disclosure and a coil disposed around each tooth of the core.

A rotating electric device according to the present disclosure is an axial-gap rotating electric device including a rotor and a stator and in which the rotor and the stator are disposed facing each other in an axial direction. The stator is the stator according to the present disclosure.

DESCRIPTION OF EMBODIMENTS

Figure 1:
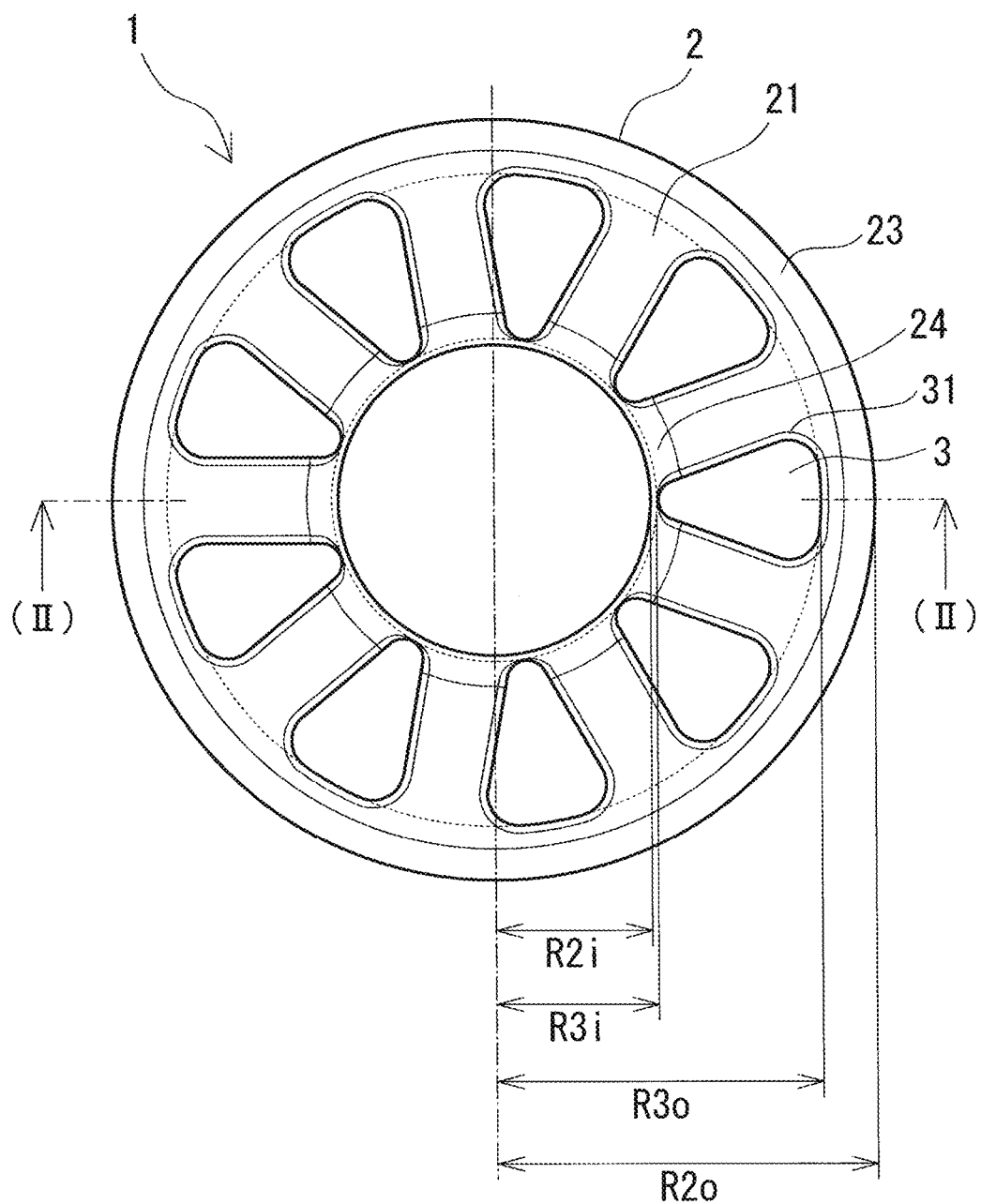
FIG. 1 is a schematic top view of a core according to an embodiment.

Problems to be Solved by Present Disclosure

There is a demand for improving the efficiency of axial-gap rotating electric devices. From the standpoint of improving the efficiency of rotating electric devices, it is desirable to enhance the magnetic properties of cores used in rotating electric devices.

One of the objects of the present disclosure is to provide a core that can enhance the magnetic properties. Another object of the present disclosure is to provide a stator equipped with the aforementioned core. Another object of the present disclosure is to provide a rotating electric device equipped with the aforementioned stator.

Advantageous Effects of Present Disclosure

The core according to the present disclosure can enhance the magnetic properties. The stator according to the present disclosure has excellent magnetic properties in the core. Furthermore, the rotating electric device according to the present disclosure has excellent efficiency.

Description of Embodiments of Present Disclosure

As a result of a keen examination of the magnetic properties of a core used in an axial-gap rotating electric device, the present inventors have obtained the following knowledge.

In the axial-gap rotating electric device, when electric current is applied to a coil, a magnetic flux flows through the core, whereby a magnetic path is created. When the magnetic flux flowing through the core decreases, the torque of the rotating electric device decreases. In the core of the rotating electric device, the magnetic flux flows in the axial direction at the teeth, whereas the magnetic flux flows in the circumferential direction at the back yoke. Therefore, the direction of the magnetic flux changes between the teeth and the back yoke.

As mentioned in Patent Literature 2, when a core formed of a molded powder compact in the related art is to be molded by using a mold, two lower punchers are normally used, such that the end surfaces of the teeth and a first flat surface of the back yoke from which the teeth protrude are molded by using different lower punchers. In this case, from the standpoint of the strength of the punchers, the molding process is performed such that the peripheral surfaces of the teeth and the first flat surface of the back yoke from which the teeth protrude are orthogonal to each other. In such a core, since the peripheral surfaces of the teeth and the first flat surface of the back yoke are orthogonal to each other, when a magnetic flux flows at the corner between each tooth and the back yoke, a portion of the magnetic flux travels outside the core to take a shortcut between the peripheral surface of the tooth and the first flat surface of the back yoke. Specifically, a leakage flux is likely to occur at the corner between each tooth and the back yoke. A leakage flux occurring in the core of the rotating electric device can lead to a decrease in torque or a decrease in efficiency due to an increased loss in the core.

The present inventors have tried using a stepped die to mold the end surfaces of the teeth with a lower puncher and the first flat surface of the back yoke with the die. Thus, it has been discovered that a first curved section can be formed at the corner between each tooth and the back yoke, and that the leakage flux occurring in the core at the corner between each tooth and the back yoke can be reduced, as compared with the aforementioned core in the related art. This is because, with the first curved section formed at the corner between each tooth and the back yoke, the leakage flux taking a shortcut between the peripheral surface of each tooth and the first flat surface of the back yoke is reduced. By providing an axial-gap rotating electric device with the core having the first curved section at the corner between each tooth and the back yoke, a decrease in torque caused by a leakage flux and a loss in the core can be suppressed. Therefore, with the aforementioned first curved section provided, the magnetic properties of the core can be enhanced, thereby improving the efficiency of the rotating electric device.

The present disclosure is based on the above knowledge. First, embodiments of the present disclosure will be described by listing them below.

(1) A core according to an embodiment of the present disclosure is a core used in an axial-gap rotating electric device and includes an annular back yoke and a plurality of teeth protruding in an axial direction that is perpendicular to a first flat surface of the back yoke. The plurality of teeth are provided on the first flat surface at intervals in a circumferential direction. The back yoke and the teeth are constituted of an integrally-molded powder compact. A first curved section that connects a peripheral surface of each tooth and the first flat surface of the back yoke is provided at a corner between the tooth and the back yoke. The first curved section has a curvature radius ranging between 0.2 mm and 1.5 mm inclusive.

The aforementioned core according to the present disclosure has the first curved section at the corner between each tooth and the back yoke, so that a leakage flux occurring at the corner between the tooth and the back yoke can be reduced. Thus, the aforementioned core can enhance the magnetic properties. With the curvature radius of the first curved section being 0.2 mm or larger, a leakage flux can be effectively reduced. Moreover, with the curvature radius of the first curved section being 1.5 mm or smaller, a space for a coil disposed around each tooth can be readily ensured, and the space factor of the coil can be improved. Therefore, a decrease in the number of turns in the coil can be suppressed, whereby a decrease in the torque of the rotating electric device can be suppressed.

(2) The core according to the above embodiment may further include an outer curved section that connects the first flat surface and an outer peripheral surface of the back yoke, and an inner curved section that connects the first flat surface and an inner peripheral surface of the back yoke. The outer curved section and the inner curved section each have a curvature radius of 0.5 mm or larger.

The aforementioned core formed of a molded powder compact is molded by compressing soft-magnetic powder with a mold. In detail, the teeth are molded with a lower puncher, and the back yoke is molded with a die. Depending on the molding pressure when the core is to be molded by using the mold, bending stress is likely to concentrate on the mold, particularly, on a corner of the die, sometimes causing a crack to form at the corner of the mold. In the above embodiment, the outer curved section and the inner curved section of the back yoke each have a curvature radius of 0.5 mm or larger, so that stress concentration at the corner of the mold can be alleviated. Thus, the above embodiment can suppress breakage of the mold. An upper limit for the curvature radius of each of the outer curved section and the inner curved section is not particularly limited, and may be, for example, 5.0 mm or smaller. When the curvature radius of each of the outer curved section and the inner curved section increases, linear sections of the outer peripheral surface and the inner peripheral surface of the back yoke become shorter relative to the thickness of the back yoke. With the outer curved section and the inner curved section of the back yoke each having a curvature radius of 5.0 mm or smaller, sufficiently long linear sections of the outer peripheral surface and the inner peripheral surface of the back yoke can be readily ensured.

(3) In the core according to the above embodiment described in embodiment (2), the curvature radius of the outer curved section and the curvature radius of the inner curved section may be different from each other.

The outer curved section and the inner curved section of the back yoke may have different curvature radii. If the outer curved section and the inner curved section are to have different curvature radii, the curvature radius of the outer curved section is preferably larger than the curvature radius of the inner curved section. When the aforementioned core is to be molded by using a mold, the outer peripheral corner of the mold that forms the corner at the outer peripheral edge of the back yoke tends to experience higher stress than the inner peripheral corner of the mold that forms the corner at the inner peripheral edge of the back yoke. When the curvature radius of the outer curved section is larger than the curvature radius of the inner curved section, stress concentration occurring at the outer peripheral corner of the mold can be effectively alleviated. Thus, in the above embodiment, breakage of the mold can be readily suppressed. In a case where a rotating electric device is constituted by using the aforementioned core, a magnetic flux tends to flow at the inner peripheral side of the back yoke than the outer peripheral side thereof. With the curvature radius of the outer curved section being larger than the curvature radius of the inner curved section, an effective magnetic-path area of the back yoke can be readily ensured. As a result, magnetic-flux concentration at the inner peripheral side of the back yoke can be suppressed, whereby an advantage of improving the torque and the efficiency of the rotating electric device can be expected.

(4) In the core according to the above embodiment, at least one of an outer peripheral surface and an inner peripheral surface of the back yoke may have a linear section extending in the axial direction, and the linear section may have a length that is 15% or more of a thickness of the back yoke.

In a case where a rotating electric device is constituted by accommodating the aforementioned core in a casing, the outer peripheral surface of the back yoke is sometimes engaged with the inner peripheral surface of the casing. In a case where the outer peripheral surface of the back yoke has a linear section, the linear section of the outer peripheral surface comes into surface contact with the inner peripheral surface of the casing, so that the core can be readily secured to the casing. In a case where a rotating electric device is constituted by using the aforementioned core, a bus bar that connects coils is sometimes attached within the back yoke. In a case where the inner peripheral surface of the back yoke has a linear section, the linear section of the inner peripheral surface comes into surface contact with the bus bar, so that the bus bar can be readily secured to the core. In the above embodiment, the length of the linear section of at least one of the outer peripheral surface and the inner peripheral surface of the back yoke is 15% or more of the thickness of the back yoke, so that the casing and the bus bar can be readily joined to the core. At the outer peripheral surface and the inner peripheral surface of the back yoke, an upper limit for the ratio of the length of the linear section to the thickness of the back yoke is not particularly limited, and may be, for example, 75% or less of the thickness of the back yoke. The length of the linear section ranges between, for example, 0.5 mm and 9 mm inclusive. The thickness of the back yoke ranges between, for example, 1.5 mm and 10 mm inclusive.

(5) In the core according to the above embodiment, a difference between a dimension, in a radial direction, from an axial center to an outer peripheral surface of the back yoke and a dimension, in the radial direction, from the axial center of the back yoke to a surface located at an outer peripheral side of the teeth may be 6.0 mm or smaller.

In the back yoke, a region from the outer peripheral surface of the back yoke to the protruding part of the teeth is defined as an outer peripheral region. When the aforementioned molded core is to be removed from the mold, bending stress sometimes acts on the outer peripheral region of the back yoke. This stress may sometimes cause the outer peripheral region to deform. Deformation of the outer peripheral region caused by stress occurring when the core is removed from the mold can be suppressed more readily with decreasing dimension, in the radial direction, of the outer peripheral region in the back yoke. In the above embodiment, the difference between the dimension, in the radial direction, from the axial center to the outer peripheral surface of the back yoke and the dimension, in the radial direction, from the axial center of the back yoke to the surface located at the outer peripheral side of the teeth is 6.0 mm or smaller. Accordingly, the dimension, in the radial direction, of the outer peripheral region in the back yoke is reduced, so that deformation of the outer peripheral region can be suppressed. In the following description, the dimension, in the radial direction, from the axial center to the outer peripheral surface of the back yoke may sometimes be referred to as "outer radius of the back yoke". The dimension, in the radial direction, from the axial center of the back yoke to the surface located at the outer peripheral side of the teeth may sometimes be referred to as "outer radius of the teeth".

Furthermore, with the difference between the outer radius of the back yoke and the outer radius of the teeth being 6.0 mm or smaller, a compression area when the core is molded by using the mold can be reduced. Therefore, high molding pressure can be applied, so that the core can be increased in density. More specifically, the difference between the outer radius of the back yoke and the outer radius of the teeth may be 4.0 mm or smaller, or 3.0 mm or smaller.

(6) In the core according to the above embodiment, a difference between a dimension, in a radial direction, from an axial center of the back yoke to a surface located at an inner peripheral side of the teeth and a dimension, in the radial direction, from the axial center to an inner peripheral surface of the back yoke may be 7.0 mm or smaller.

In the back yoke, a region from the inner peripheral surface of the back yoke to the protruding part of the teeth is defined as an inner peripheral region. When the aforementioned molded core is to be removed from the mold, bending stress sometimes acts on the inner peripheral region of the back yoke. This stress may sometimes cause the inner peripheral region to deform. Deformation of the inner peripheral region caused by stress occurring when the core is removed from the mold can be suppressed more readily with decreasing dimension, in the radial direction, of the inner peripheral region in the back yoke. In the above embodiment, the difference between the dimension, in the radial direction, from the axial center of the back yoke to the surface located at the inner peripheral side of the teeth and the dimension, in the radial direction, from the axial center to the inner peripheral surface of the back yoke is 7.0 mm or smaller. Accordingly, the dimension, in the radial direction, of the inner peripheral region in the back yoke is reduced, so that deformation of the inner peripheral region can be suppressed. In the following description, the dimension, in the radial direction, from the axial center of the back yoke to the surface located at the inner peripheral side of the teeth may sometimes be referred to as "inner radius of the teeth". The dimension, in the radial direction, from the axial center to the inner peripheral surface of the back yoke may sometimes be referred to as "inner radius of the back yoke".

Furthermore, with the difference between the inner radius of the teeth and the inner radius of the back yoke being 7.0 mm or smaller, a compression area when the core is molded by using the mold can be reduced. Therefore, high molding pressure can be applied, so that the core can be increased in density. More specifically, the difference between the inner radius of the teeth and the inner radius of the back yoke may be 5.0 mm or smaller, or 4.0 mm or smaller.

(7) The core according to the above embodiment may further include a protrusion or a recess partially provided in at least one of an outer peripheral surface and an inner peripheral surface of the back yoke, the protrusion protruding in a radial direction, the recess being recessed in the radial direction.

In a case where a rotating electric device is constituted by using the aforementioned core, the outer peripheral surface of the back yoke has the protrusion or the recess in the above embodiment, so that the protrusion or the recess can be used for positioning relative to the casing. For example, the outer peripheral surface of the back yoke is provided with the protrusion or the recess, and the inner peripheral surface of the casing is provided with a recess or protrusion corresponding to this protrusion or recess. By engaging the protrusion and the recess with each other, the core can be positioned relative to the casing. Furthermore, in a case where a rotating electric device is constituted by using the aforementioned core, the aforementioned bus bar is sometimes disposed within the back yoke. By providing the inner peripheral surface of the back yoke with the protrusion or the recess, the protrusion or the recess can be used for positioning the bus bar. For example, the inner peripheral surface of the back yoke is provided with the protrusion or the recess, and the bus bar is provided with a recess or protrusion corresponding to this protrusion or recess. By engaging the protrusion and the recess with each other, the bus bar can be positioned relative to the core.

(8) In the core according to the above embodiment, the molded powder compact may be constituted of a group of a plurality of coated soft-magnetic particles each having an insulation coating over a surface of the soft-magnetic particle. The soft-magnetic particles may be iron-based particles composed of pure iron or at least one type of iron-based alloy selected from an Fe—Si-based alloy, an Fe—Al-based alloy, an Fe—Cr—Al-based alloy, and an Fe—Cr—Si-based alloy.

Pure iron or the aforementioned iron-based alloy is relatively soft. Therefore, with the soft-magnetic particles being iron-based particles composed of pure iron or the aforementioned iron-based alloy, the soft-magnetic particles are likely to deform during the molding process of the molded powder compact. Thus, in the above embodiment, a high-density molded powder compact with highly accurate dimensions can be obtained. With the molded powder compact having an increased density, the mechanical strength and the magnetic properties of the core can be enhanced. Moreover, with each soft-magnetic particle having an insulation coating over the surface thereof, electrical insulation between the soft-magnetic particles can be enhanced. Therefore, an iron loss of the core caused due to eddy-current loss can be reduced.

(9) In the core according to the above embodiment described in embodiment (8), the insulation coating may include a phosphate coating.

A phosphate coating has high adhesiveness to iron-based particles and has excellent deformability. Therefore, with the insulation coating including a phosphate coating, the insulation coating is likely to conform to the deformation of the iron-based particle during the molding process of the molded powder compact. Accordingly, in the above embodiment, the insulation coating is less likely to become damaged, thereby reducing an iron loss of the core.

(10) In the core according to the above embodiment, a relative density of the molded powder compact may be 90% or higher.

With the relative density of the molded powder compact being 90% or higher in the above embodiment, the molded powder compact has a high density. With the molded powder compact having an increased density, the mechanical strength and the magnetic properties of the core can be enhanced.

(11) A core according to an embodiment of the present disclosure is a core used in an axial-gap rotating electric device and includes an annular back yoke and a plurality of teeth protruding in an axial direction that is perpendicular to a first flat surface of the back yoke. The plurality of teeth are provided on the first flat surface at intervals in a circumferential direction. The back yoke and the teeth are constituted of an integrally-molded powder compact. A first curved section that connects a peripheral surface of each tooth and the first flat surface of the back yoke is provided at a corner between the tooth and the back yoke. The first curved section has a curvature radius ranging between 0.2 mm and 1.5 mm inclusive. The core further includes an outer curved section that connects the first flat surface and an outer peripheral surface of the back yoke, and an inner curved section that connects the first flat surface and an inner peripheral surface of the back yoke. The outer curved section and the inner curved section each have a curvature radius of 0.5 mm or larger. At least one of the outer peripheral surface and the inner peripheral surface of the back yoke has a linear section extending in the axial direction. The linear section has a length that is 15% or more of a thickness of the back yoke.

The aforementioned core according to the present disclosure has the first curved section at the corner between each tooth and the back yoke, so that a leakage flux occurring at the corner between the tooth and the back yoke can be reduced. Thus, the aforementioned core can enhance the magnetic properties. In particular, with the curvature radius of the first curved section being 0.2 mm or larger, a leakage flux can be effectively reduced. Moreover, with the curvature radius of the first curved section being 1.5 mm or smaller, a space for a coil disposed around each tooth can be ensured, and the space factor of the coil can be improved. Therefore, a decrease in the number of turns in the coil can be suppressed, whereby a decrease in the torque of the rotating electric device can be suppressed.

Furthermore, as described in the above embodiment according to embodiment (2), the outer curved section and the inner curved section of the back yoke each have a curvature radius of 0.5 mm or larger, so that stress concentration at the corner of the mold can be alleviated. Thus, the aforementioned core can suppress breakage of the mold.

Moreover, as described in the above embodiment according to embodiment (4), the length of the linear section of at least one of the outer peripheral surface and the inner peripheral surface of the back yoke is 15% or more of the thickness of the back yoke, so that the casing and the bus bar can be readily joined to the core.

(12) A stator according to an embodiment of the present disclosure is a stator in an axial-gap rotating electric device and includes the core according to any one of the above embodiments (1) to (11) and a coil disposed around each tooth of the core.

The aforementioned stator has excellent magnetic properties in the core. This is because, with the aforementioned core according to the embodiment provided, the magnetic properties of the core can be enhanced.

(13) A rotating electric device according to an embodiment of the present disclosure is an axial-gap rotating electric device including a rotor and the stator according to the above embodiment (12) and in which the rotor and the stator are disposed facing each other in an axial direction.

The aforementioned rotating electric device has excellent efficiency. This is because, with the aforementioned stator according to the embodiment provided, the magnetic properties of the core can be enhanced.

Details of Embodiments of Present Disclosure

Specific examples of a core, a stator, and a rotating electric device according to an embodiment of the present disclosure will be described below with reference to the drawings. In the drawings, the same reference sign denotes an object of the same name. The present invention is not limited to these examples, and is intended to include all alterations indicated by the scope of the claims and within the gist and the scope equivalent to the scope of the claims.

[Core]

Figure 2:
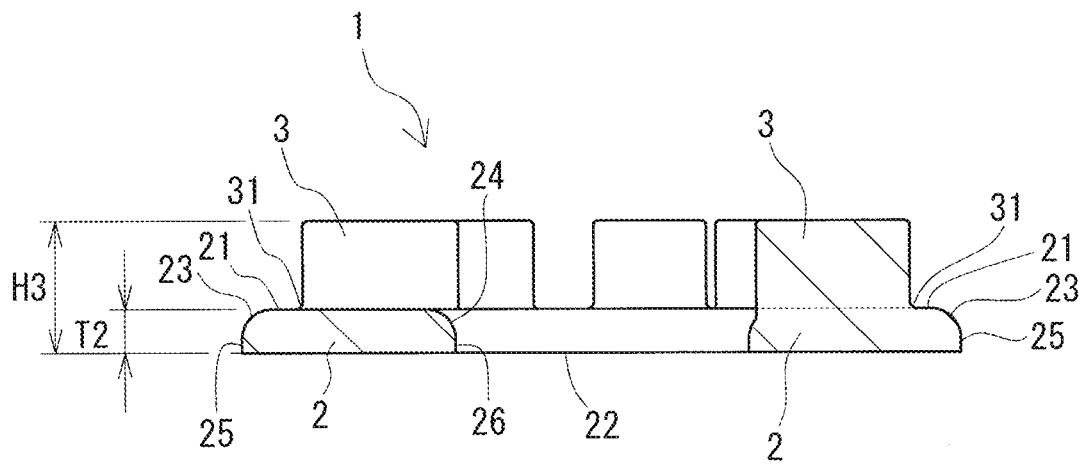
FIG. 2 is a schematic cross-sectional view taken along line II-II in FIG. 1.
Figure 3:
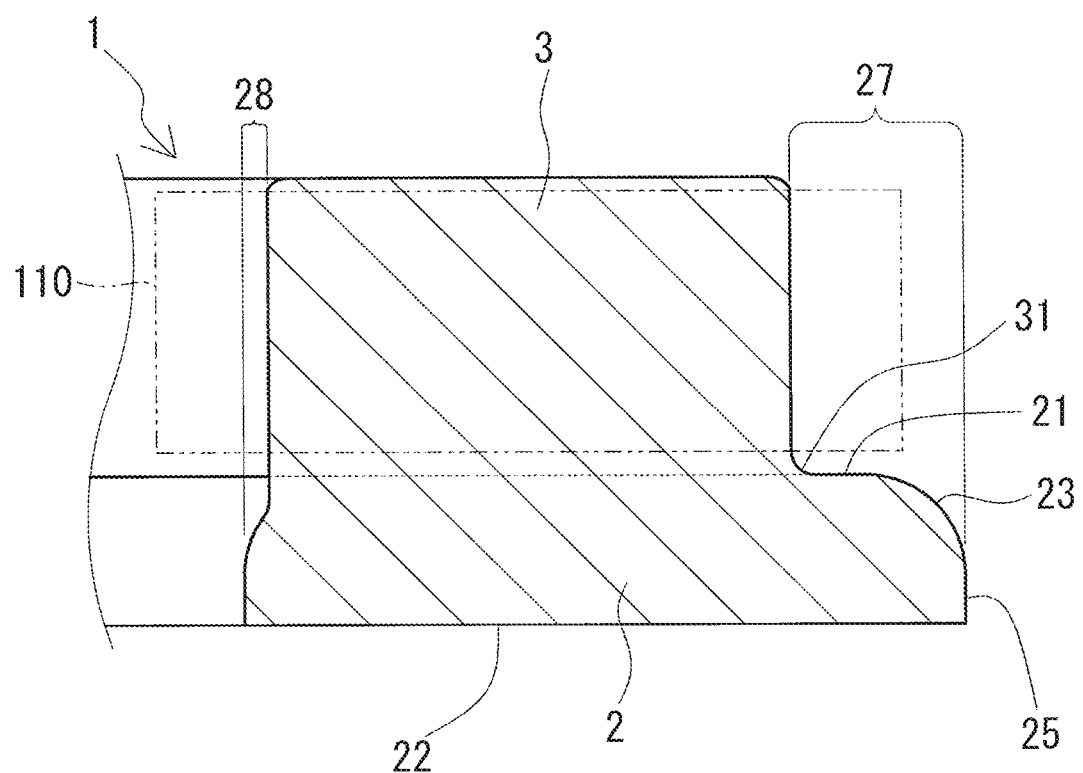
FIG. 3 is a partially-enlarged schematic cross-sectional view of FIG. 2.

A core 1 according to an embodiment will be described with reference to FIGS. 1 to 3. The core 1 is used in an axial-gap rotating electric device. The core 1 includes an annular back yoke 2 and a plurality of teeth 3 protruding from the back yoke 2. As shown in FIGS. 2 and 3, one of the features of the core 1 is that it has a first curved section 31 at the corner between each tooth 3 and the back yoke 2. When describing the core 1 below, the side toward which the teeth 3 protrude will be defined as an upper side, whereas the side opposite thereto will be defined as a lower side.

(Back Yoke)

The back yoke 2 shown in FIG. 1 has a shape of an annular disk. As shown in FIG. 2, one of flat surfaces of the back yoke 2, that is, an upper surface, is defined as a first flat surface 21, whereas a surface opposite the first flat surface 21, that is, a lower surface, is defined as a second flat surface 22. As shown in FIG. 2, the first flat surface 21 of the back yoke 2 is provided with the teeth 3 protruding therefrom. The back yoke 2 has, for example, a thickness ranging between 1.5 mm and 10 mm inclusive, more specifically, between 2.0 mm and 7.0 mm inclusive. In FIG. 2, the thickness of the back yoke 2 is indicated by T2. In this example, the first flat surface 21 and the second flat surface 22 are flat surfaces extending in a direction orthogonal to the axial direction of the back yoke 2.

As shown in FIG. 2, in the back yoke 2, the corner at the outer peripheral edge of the first flat surface 21 is provided with an outer curved section 23 that connects the first flat surface 21 and the outer peripheral surface of the back yoke 2. The outer curved section 23 is a circular arc that inscribes the extension surface of the first flat surface 21 and the outer peripheral surface of the back yoke 2. In other words, the outer curved section 23 is a circular arc that protrudes toward the line of intersection of both extension surfaces. Furthermore, the corner at the inner peripheral edge of the first flat surface 21 is provided with an inner curved section 24 that connects the first flat surface 21 and the inner peripheral surface of the back yoke 2. The inner curved section 24 is a circular arc that inscribes the extension surface of the first flat surface 21 and the inner peripheral surface of the back yoke 2. In other words, the inner curved section 24 is a circular arc that protrudes toward the line of intersection of both extension surfaces. The curvature radius of each of the outer curved section 23 and the inner curved section 24 is, for example, preferably 0.5 mm or larger, more preferably 1.0 mm or larger, and even more preferably 1.5 mm or larger. An upper limit for the curvature radius of each of the outer curved section 23 and the inner curved section 24 is, for example, 5.0 mm or smaller, more specifically, 4.0 mm or smaller, even more specifically, 3.0 mm or smaller. Furthermore, the curvature radius of each of the outer curved section 23 and the inner curved section 24 is, for example, preferably between 10% and 85% inclusive of the thickness of the back yoke 2, and more preferably between 20% and 60% inclusive of the thickness of the back yoke 2. The curvature radius of the outer curved section 23 and the curvature radius of the inner curved section 24 may be the same or may be different from each other. In FIG. 2, the curvature radius of the outer curved section 23 and the curvature radius of the inner curved section 24 are the same.

With the curvature radius of each of the outer curved section 23 and the inner curved section 24 being 0.5 mm or larger, stress concentration occurring at a corner of a mold can be alleviated when the core 1 is to be formed by using the mold. Thus, breakage of the mold can be suppressed. The reason for this will be described later. Moreover, with the curvature radius of each of the outer curved section 23 and the inner curved section 24 being 5.0 mm or smaller, the lengths of linear sections 25 and 26 of the outer peripheral surface and the inner peripheral surface of the back yoke 2 can be readily ensured. This is because, when the curvature radius of the outer curved section 23 or the inner curved section 24 is increased, the linear section 25 or 26 of the outer peripheral surface or the inner peripheral surface becomes shorter relative to the thickness of the back yoke 2.

If the curvature radius of the outer curved section 23 and the curvature radius of the inner curved section 24 are to be made different from each other, it is preferable that the curvature radius of the outer curved section 23 be larger than the curvature radius of the inner curved section 24. When the core 1 is to be formed by using a mold, the outer peripheral corner of the mold that forms the corner at the outer peripheral edge of the back yoke 2 tends to experience higher stress than the inner peripheral corner of the mold that forms the corner at the inner peripheral edge of the back yoke 2. When the curvature radius of the outer curved section 23 is larger than the curvature radius of the inner curved section 24, stress concentration occurring at the outer peripheral corner of the mold can be effectively alleviated. Thus, breakage of the mold can be readily suppressed.

It is preferable that at least one of the outer peripheral surface and the inner peripheral surface of the back yoke 2 have a linear section that extends in the axial direction. In this example, the outer peripheral surface and the inner peripheral surface have the linear sections 25 and 26. For example, the length of each of the linear sections 25 and 26 is preferably 15% or more of the thickness of the back yoke 2, and more preferably 25% or more of the thickness of the back yoke 2.

When the core 1 is to be accommodated in a casing, the outer peripheral surface of the back yoke 2 is sometimes engaged with the inner peripheral surface of the casing. If the outer peripheral surface of the back yoke 2 has the linear section 25, the linear section 25 comes into surface contact with the inner peripheral surface of the casing, so that the core 1 can be readily secured to the casing. Furthermore, when a rotating electric device is to be constituted by using the core 1, a bus bar is sometimes provided within the back yoke 2. If the inner peripheral surface of the back yoke 2 has the linear section 26, the linear section 26 comes into surface contact with the bus bar, so that the bus bar can be readily secured to the core 1. With the length of each of the linear sections 25 and 26 being 15% or more of the thickness of the back yoke 2, the casing and the bus bar can be readily joined to the core 1. An upper limit for the ratio of the length of each of the linear sections 25 and 26 to the thickness of the back yoke 2 is, for example, 90% or less of the thickness of the back yoke 2, more specifically, 80% or less of the thickness of the back yoke 2. The length of each of the linear sections 25 and 26 ranges between, for example, 0.5 mm and 9 mm inclusive, more specifically, between 0.8 mm and 8.0 mm inclusive.

(Teeth) As shown in FIG. 1, the teeth 3 are provided on the first flat surface 21 of the back yoke 2 at intervals in the circumferential direction. As shown in FIG. 2, the teeth 3 protrude in the axial direction of the back yoke 2 from the first flat surface 21. In detail, the teeth 3 protrude in a direction perpendicular to the first flat surface 21. The number of teeth 3 may be set as appropriate, such as three or more, more specifically, six or more. In this example, nine teeth 3 are disposed at equal intervals in the circumferential direction, as shown in FIG. 1. The shape of each tooth 3 is not particularly limited and may be, for example, any of various shapes, such as a cylindrical shape or a polygonal prismatic shape. In this example, each tooth 3 has a triangular prismatic shape. Alternatively, each tooth 3 may have a rectangular prismatic shape, such as a trapezoidal prismatic shape.

As shown in FIGS. 2 and 3, the first curved section 31 that connects the peripheral surface of each tooth 3 and the first flat surface 21 of the back yoke is provided at the corner between the tooth 3 and the back yoke 2. The first curved section 31 has a curvature radius ranging between 0.2 mm and 1.5 mm inclusive, preferably 0.3 mm or more, more preferably, between 0.4 mm and 1.2 mm inclusive. With this first curved section 31 provided, the root side of each tooth 3 connected to the back yoke 2 is formed such that the peripheral surface of the tooth 3 expands toward the first flat surface 21. Of the peripheral surface of the tooth 3, an area excluding the first curved section 31 extends linearly in the axial direction of the tooth 3.

As shown in FIG. 3, a coil 110 is disposed around the peripheral surface of each tooth 3. By applying electric current to the coil 110, a magnetic flux flows through the core 1, whereby a magnetic path is created. With the curvature radius of the first curved section 31 being 0.2 mm or larger, a leakage flux occurring at the corner between the tooth 3 and the back yoke 2 can be reduced. Moreover, with the curvature radius of the first curved section 31 being 1.5 mm or larger, a space for the coil 110 disposed around each tooth 3 can be readily ensured. Therefore, a decrease in the number of turns in the coil 110 can be suppressed.

In order to ensure electrical insulation between the core 1 and each coil 110, an insulation coating (not shown) may be provided over the surface of the core 1. The insulation coating can be formed by applying electrical insulating resin. Examples of the resin used for forming the insulation coating include epoxy-based resin, fluorine-based resin, and polyimide-based resin. The insulation coating may be provided over the surface of the core 1 that at least comes into contact with each coil 110. For example, the insulation coating may be provided over the peripheral surface of each tooth 3 and the first flat surface 21 of the back yoke 2. Moreover, an insulator (not shown) may be interposed between the core 1 and each coil 110.

In the core 1, a difference between an outer radius of the back yoke 2 and an outer radius of the teeth 3 preferably ranges between 0 mm and 6.0 mm inclusive, is more preferably 4.0 mm or smaller, and is even more preferably 3.0 mm or smaller. The outer radius of the back yoke 2 refers to a dimension, in the radial direction, from the axial center of the back yoke 2 to the outer peripheral surface thereof. The outer radius of the teeth 3 refers to a dimension, in the radial direction, from the axial center of the back yoke 2 to a surface located at the outer peripheral side of the teeth 3. In FIG. 1, the outer radius of the back yoke 2 is indicated by R2*o*, and the outer radius of the teeth 3 is indicated by R3*o*. With the difference (R2*o*–R3*o*) between the outer radius of the back yoke 2 and the outer radius of the teeth 3 being 6.0 mm or smaller, the dimension, in the radial direction, of an outer peripheral region 27 in the back yoke 2 is reduced, as shown in FIG. 3. The outer peripheral region 27 of the back yoke 2 refers to a region from the outer peripheral surface of the back yoke 2 to the protruding part of the teeth 3. Bending stress acting on the outer peripheral region 27 when the molded core 1 is removed from the mold can be reduced with decreasing dimension, in the radial direction, of the outer peripheral region 27 in the back yoke 2. The reason for this will be described later. Thus, with the difference between the outer radius R2*o* of the back yoke 2 and the outer radius R3*o* of the teeth 3 being 6.0 mm or smaller, more specifically, 4.0 mm or smaller, deformation of the outer peripheral region 27 caused by stress occurring during a removal process from the mold can be suppressed.

Furthermore, when the difference between the outer radius R2*o* of the back yoke 2 and the outer radius R3*o* of the teeth 3 is 6.0 mm or smaller, more specifically, 3.0 mm or smaller, a compression area when the core is molded by using the mold can be reduced. Therefore, high molding pressure can be applied, so that the core 1 can be increased in density. The reason for this will be described later.

In the core 1, a difference between an inner radius of the teeth 3 and an inner radius of the back yoke 2 preferably ranges between 0 mm and 7.0 mm inclusive, is more preferably 5.0 mm or smaller, and is even more preferably 4.0 mm or smaller. The inner radius of the teeth 3 refers to a dimension, in the radial direction, from the axial center of the back yoke 2 to a surface located at the inner peripheral side of the teeth 3. The inner radius of the back yoke 2 refers to a dimension, in the radial direction, from the axial center of the back yoke 2 to the inner peripheral surface thereof. In FIG. 1, the inner radius of the teeth 3 is indicated by R3*i*, and the inner radius of the back yoke 2 is indicated by R2*i*. With the difference (R3*i*–R2*i*) between the inner radius of the teeth 3 and the inner radius of the back yoke 2 being 7.0 mm or smaller, the dimension, in the radial direction, of an inner peripheral region 28 in the back yoke 2 is reduced, as shown in FIG. 3. The inner peripheral region 28 of the back yoke 2 refers to a region from the inner peripheral surface of the back yoke 2 to the protruding part of the teeth 3. Bending stress acting on the inner peripheral region 28 when the molded core 1 is removed from the mold can be reduced with decreasing dimension, in the radial direction, of the inner peripheral region 28 in the back yoke 2. The reason for this will be described later. Thus, with the difference between the inner radius R3*i* of the teeth 3 and the inner radius R2*i* of the back yoke 2 being 7.0 mm or smaller, more specifically, 5.0 mm or smaller, deformation of the inner peripheral region 28 caused by stress occurring during a removal process from the mold can be suppressed.

Furthermore, when the difference between the inner radius R3*i* of the teeth 3 and the inner radius R2*i* of the back yoke 2 is 7.0 mm or smaller, more specifically, 4.0 mm or smaller, a compression area when the core is molded by using the mold can be reduced. Therefore, high molding pressure can be applied, so that the core 1 can be increased in density. The reason for this will be described later.

Figure 12:
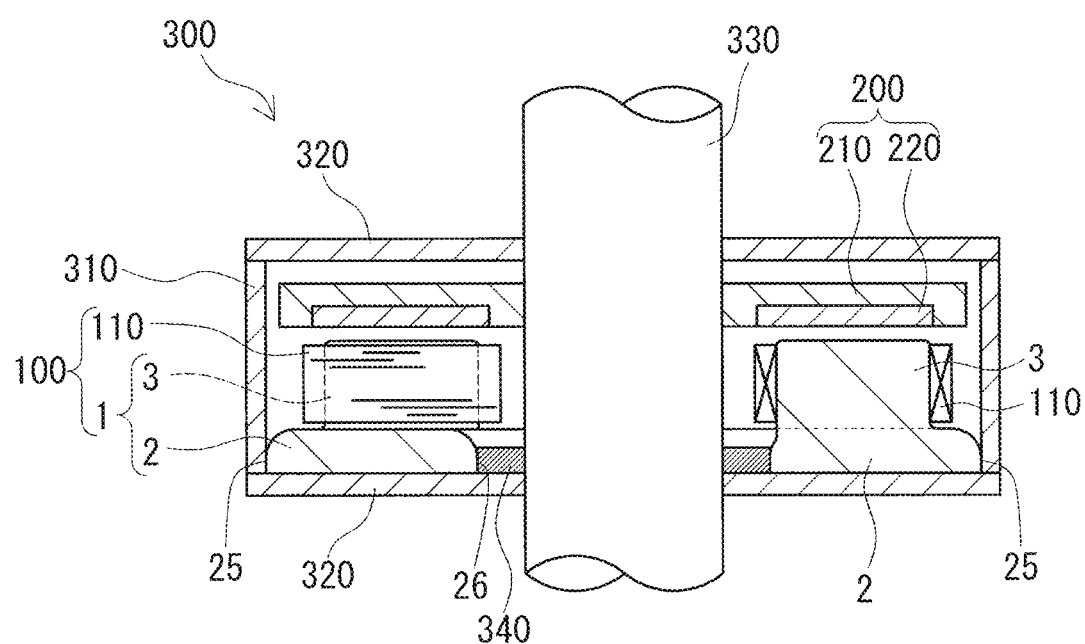
FIG. 12 is a schematic cross-sectional view of a rotating electric device according to an embodiment.

Of the plurality of teeth 3 in the core 1, a difference between the position of an end surface of the highest tooth 3 and the position of an end surface of the lowest tooth 3 is preferably, for example, 0.2 mm or smaller. The position of an end surface of a tooth 3 refers to a height position H3, in the axial direction, from the second flat surface 22, that is, the lower surface, of the back yoke 2 to the end surface of the tooth 3 in a state where the second flat surface 22 is placed on a flat surface. With the difference between the position of the end surface of the highest tooth 3 and the position of the end surface of the lowest tooth 3 being 0.2 mm or smaller, there are little height variations among the end surfaces of the teeth 3. As will be described later, when a rotating electric device 300 shown in FIG. 12 is constituted by using the core 1, the end surfaces of the teeth 3 are disposed facing magnets 220 of a rotor 200. With little height variations among the end surfaces of the teeth 3, variations in the distance between the end surfaces of the teeth 3 and the rotor 200 can be reduced in the rotating electric device 300. Accordingly, deteriorated performance of the rotating electric device 300, such as cogging, can be suppressed.

(Molded Powder Compact)

The back yoke 2 and the teeth 3 are constituted of an integrally-molded powder compact. Specifically, the core 1 is constituted of a molded powder compact. A molded powder compact is molded by compressing soft-magnetic powder. Soft-magnetic powder is a group of a plurality of coated soft-magnetic particles each having an insulation coating over the surface of the soft-magnetic particle. Specifically, a molded powder compact is constituted of a group of a plurality of coated soft-magnetic particles. In this example, the molded powder compact constituting the core 1 is substantially constituted only of soft-magnetic powder formed of coated soft-magnetic particles.

The soft-magnetic particles are, for example, iron-based particles composed of pure iron at 99% or higher by mass of purity or at least one type of iron-based alloy selected from an Fe (iron)-Si (silicon) based alloy, an Fe (iron)-Al (aluminum) based alloy, an Fe (iron)-Cr (chromium)-Al (aluminum) based alloy, and an Fe (iron)-Cr (chromium)-Si (silicon) based alloy. Pure iron or the aforementioned iron-based alloy is relatively soft. Therefore, with the soft-magnetic particles being iron-based particles composed of pure iron or the aforementioned iron-based alloy, the soft-magnetic particles are likely to deform during the molding process of the molded powder compact constituting the core 1. Thus, a high-density molded powder compact with highly accurate dimensions can be obtained. With the molded powder compact having an increased density, the mechanical strength and the magnetic properties of the core 1 can be enhanced. Moreover, with each soft-magnetic particle having an insulation coating over the surface thereof, electrical insulation between the soft-magnetic particles can be enhanced. Therefore, an iron loss of the core 1 caused due to eddy-current loss can be reduced. Examples of the insulation coating include a phosphate coating and a silica coating. It is preferable that the insulation coating include a phosphate coating. A phosphate coating has high adhesiveness to iron-based particles and has excellent deformability. Therefore, with the insulation coating including a phosphate coating, the insulation coating is likely to conform to the deformation of the iron-based particle during the molding process of the molded powder compact. Accordingly, the insulation coating is less likely to become damaged, thereby reducing an iron loss of the core 1.

A relative density of the molded powder compact constituting the core 1 is preferably 90% or higher. With the molded powder compact having an increased density, the mechanical strength and the magnetic properties of the core 1 can be enhanced. More preferably, the relative density is 93% or higher. The relative density refers to a percentage (%) of the actual density of the molded powder compact relative to the true density of the molded powder compact. The true density of the molded powder compact can be determined from the true density of the soft-magnetic powder. The relative density of the molded powder compact can be determined as, for example, [(molding density of molded powder compact/true density of molded powder compact)×100]. The molding density of the molded powder compact can be determined by immersing the molded powder compact in oil to impregnate the molded powder compact with oil, and then calculating the following: [density of oil impregnated molded powder compact×(mass of molded powder compact before oil impregnation/mass of molded powder compact after oil impregnation)]. An oil density is a value obtained by dividing the mass of the molded powder compact after oil impregnation by the volume. The volume of the molded powder compact can be measured by representatively using the liquid replacement method.

[Mold]

Figure 4:
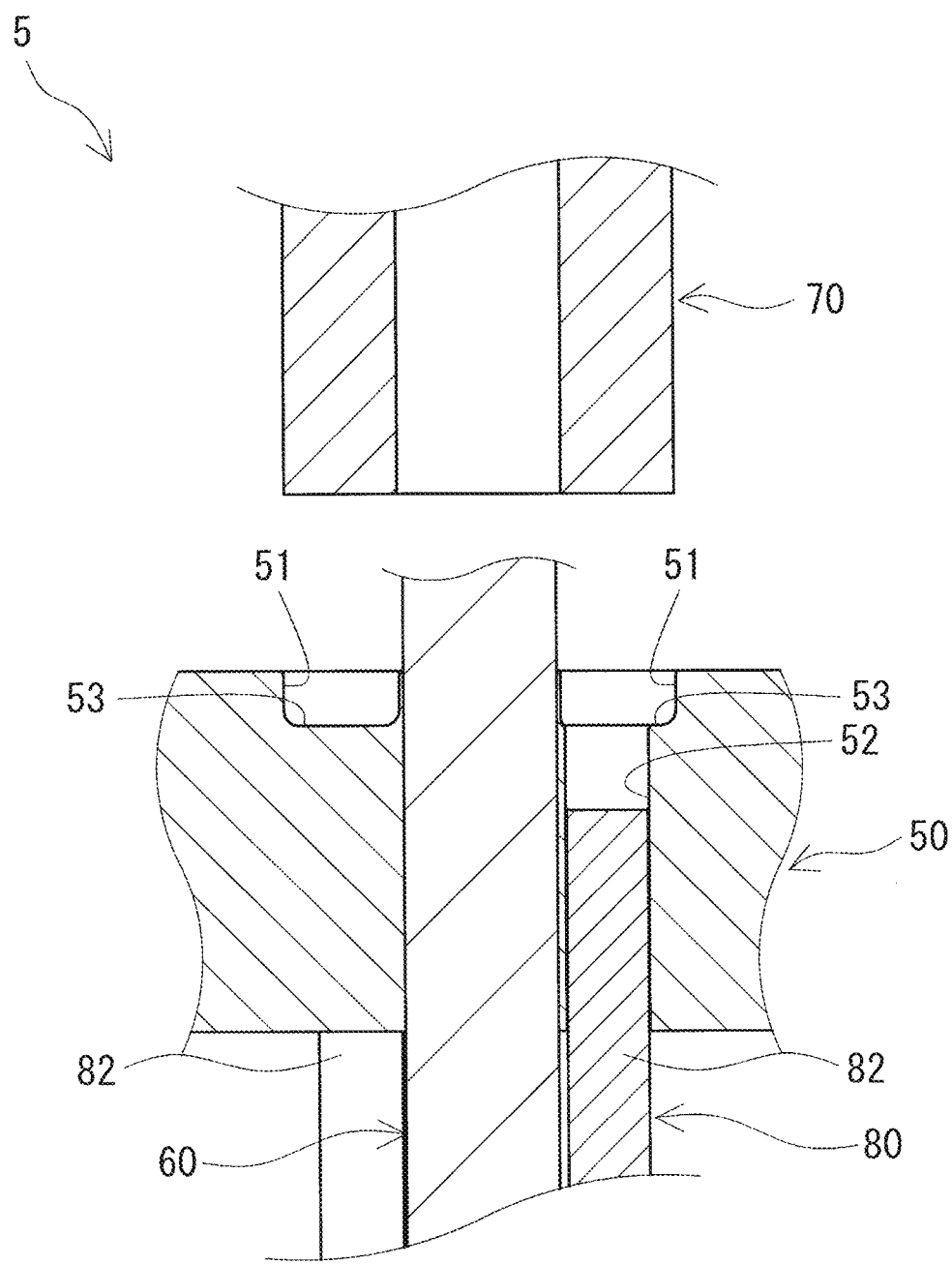
FIG. 4 is a schematic cross-sectional view illustrating an example of a mold for molding the core according to the embodiment.

The core 1 formed of the molded powder compact can be manufactured by compressing and molding soft-magnetic powder with a mold. A mold 5 used for manufacturing the core 1 will be described below with reference to FIGS. 4 to 10. As shown in FIG. 4, the mold 5 includes a die 50, a core rod 60 disposed within the die 50, and upper and lower punchers 70 and 80 to be engaged with the die 50.

Figure 5:
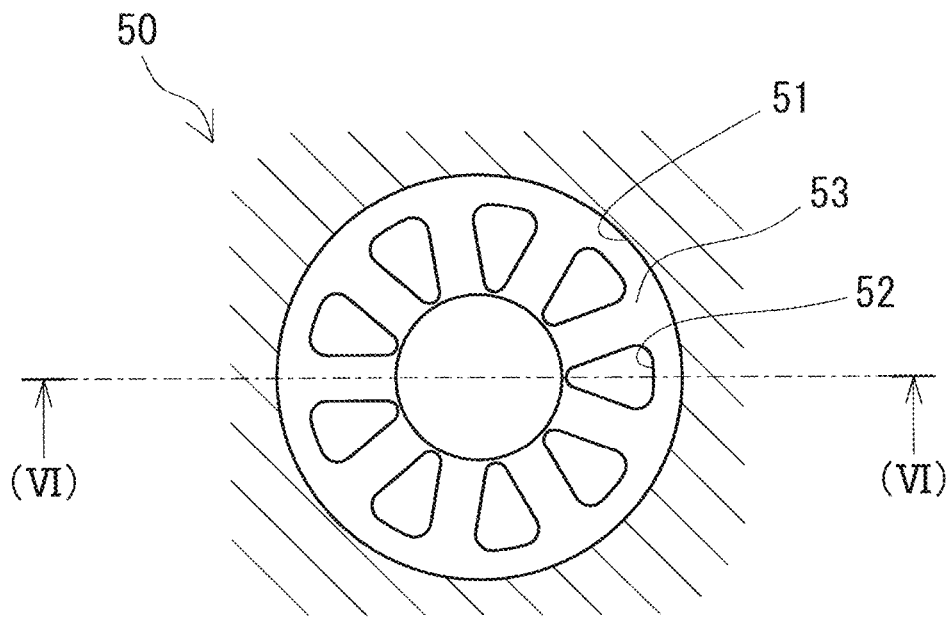
FIG. 5 is a schematic top view of a die.
Figure 6:
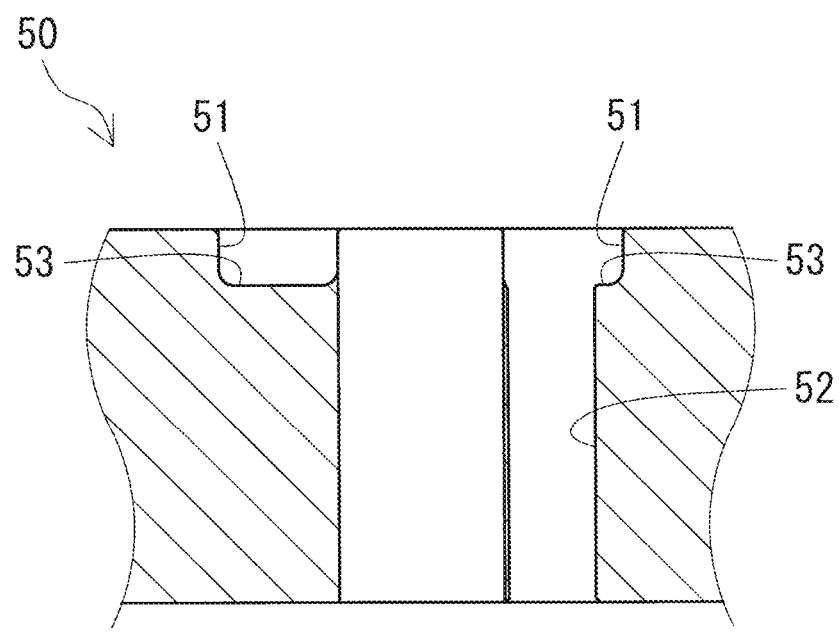
FIG. 6 is a schematic cross-sectional view taken along line VI-VI in FIG. 5.
Figure 8:
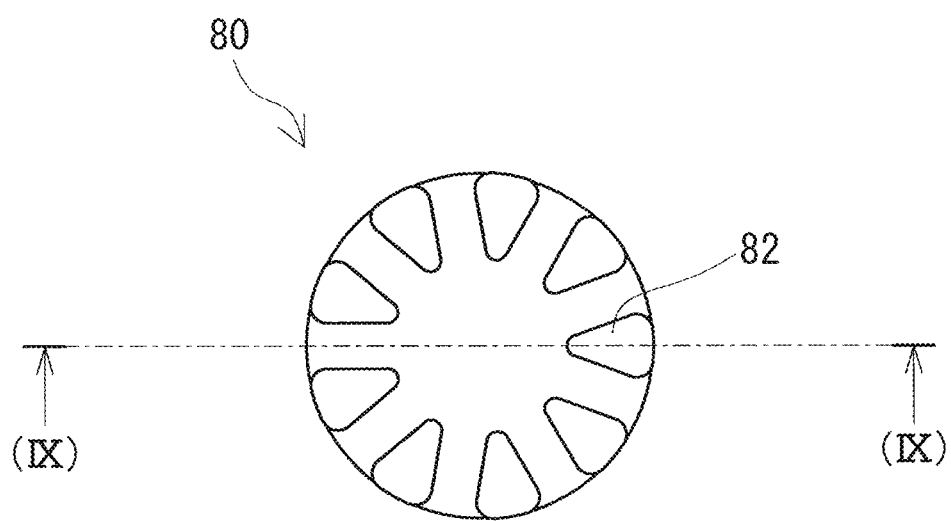
FIG. 8 is a schematic top view of a lower puncher.
Figure 9:
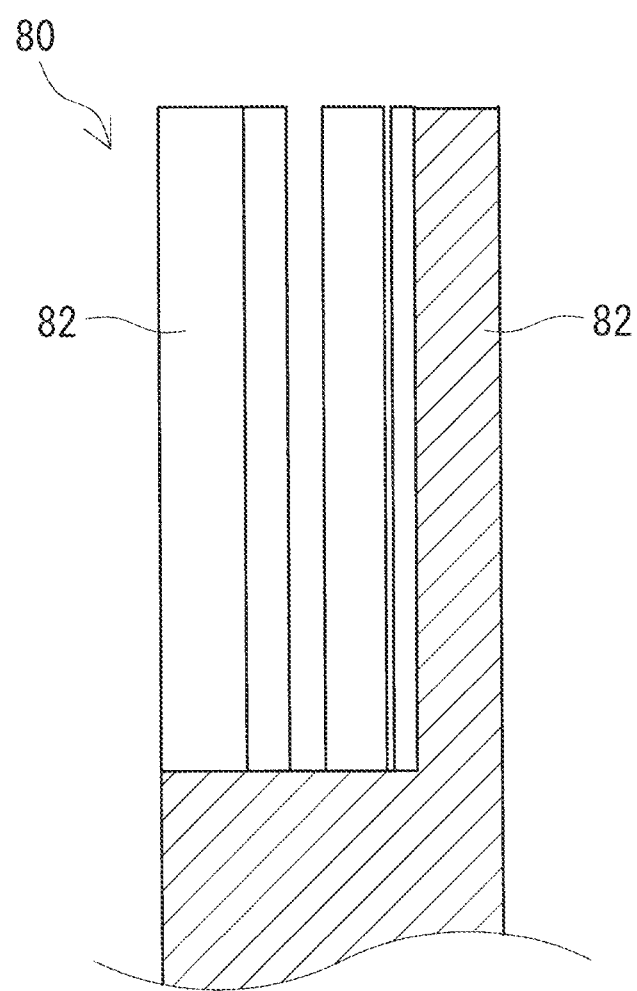
FIG. 9 is a schematic cross-sectional view taken along line IX-IX in FIG. 8.

The die 50 is a stepped die. As shown in FIGS. 5 and 6, the die 50 includes a first molding section 51 and a plurality of second molding sections 52, and has a step 53 between the first molding section 51 and the second molding sections 52. The first molding section 51 forms a space for molding the back yoke 2 shown in FIGS. 1 and 2. The second molding sections 52 form spaces for molding the teeth 3 shown in FIGS. 1 and 2. The first molding section 51 is provided at the upper side of the die 50. The second molding sections 52 are provided continuously from the first molding section S1at the lower side of the die 50. The core rod 60 is disposed coaxially within the first molding section 51 of the die 50. The upper puncher 70 is positioned at the upper side of the die 50 and is engaged with the first molding section 51 from above. The lower puncher 80 is positioned at the lower side of the die 50 and is engaged with the second molding sections 52 from below. As shown in FIGS. 8 and 9, the lower puncher 80 has, at the distal end thereof, a plurality of punching sections 82 that are to be fitted to the second molding sections 52 shown in FIGS. 5 and 6. The base ends of the punching sections 82 are formed as a single unit.

Figure 10:
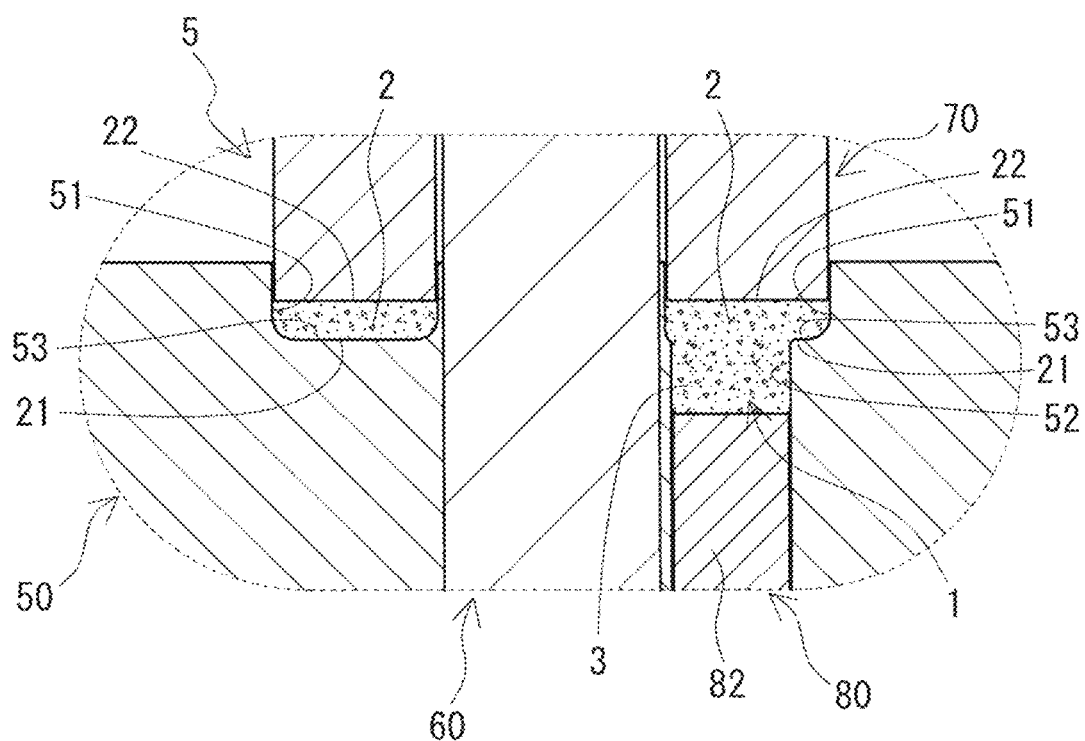
FIG. 10 is a partially-enlarged schematic cross-sectional view illustrating a state where the core is molded by using the mold.

In the mold 5 shown in FIG. 4, the first molding section 51 of the die 50, the core rod 60, and the upper puncher 70 form an annular space for molding the back yoke 2 shown in FIGS. 1 and 2. Moreover, the second molding sections 52 of the die 50 and the punching sections 82 of the lower puncher 80 form a columnar space for molding the teeth 3 shown in FIGS. 1 and 2. When the core 1 is to be molded by using the mold 5, the core rod 60 is disposed within the first molding section 51 of the die 50, and the punching sections 82 of the lower puncher 80 are respectively fitted to the second molding sections 52. In this state, the first molding section 51 and the second molding sections 52 are filled with raw powder (not shown). Then, the upper puncher 70 is lowered, so that the raw powder is pressed by the upper puncher 70 from the upper side of the first molding section 51. As shown in FIG. 10, when the core 1 is molded by using the mold 5, the outer peripheral surface of the back yoke 2 is molded by the inner peripheral surface of the first molding section 51, and the first flat surface 21 of the back yoke 2 is molded by the surface of the step 53. The inner peripheral surface of the back yoke 2 is molded by the outer peripheral surface of the core rod 60. The second flat surface 22 of the back yoke 2 is molded by the end surface of the upper puncher 70. Moreover, the peripheral surfaces of the teeth 3 are molded by the inner peripheral surfaces of the second molding sections 52. The end surfaces of the teeth 3 are molded by the end surfaces of the punching sections 82 of the lower puncher 80. When the molded core 1 is to be removed from the mold 5, the upper puncher 70 is lifted, and the die 50 and the core rod 60 are lowered relative to the lower puncher 80. Then, the core 1 is removed from the die 50 while the end surfaces of the teeth 3 are supported by the punching sections 82.

The raw powder has soft-magnetic powder as a main component. A main component means that the content is 90% or higher by mass when the raw powder is 100% by mass. The raw powder may contain a lubricant or binder resin as an additive, where appropriate.

For example, an average particle diameter of the soft-magnetic powder may range between 20 µm and 300 µm inclusive, more specifically, between 40 µm and 250 µm inclusive. Setting the average particle diameter of the soft-magnetic powder within the aforementioned range facilitates the ease of handling and the ease of compression molding. The average particle diameter of the soft-magnetic powder is measured by using a laser diffraction, light-scattering particle diameter, particle-size-distribution measuring device and refers to a particle diameter at which the integrated mass is 50% of the mass of all particles.

By increasing the molding pressure when compressing the raw powder containing the soft-magnetic powder, the core 1 can be increased in density. The molding pressure may be set to, for example, 700 MPa or higher, more specifically, 800 MPa or higher.

Figure 7:
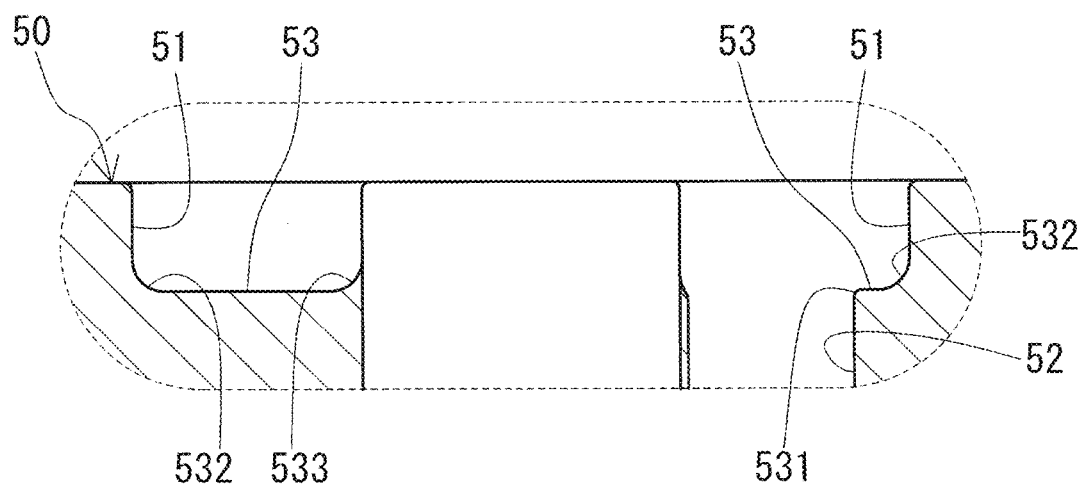
FIG. 7 is a partially-enlarged schematic cross-sectional view of FIG. 6.

As shown in FIG. 7, in the die 50, a first corner 531 between the surface of the step 53 and the inner peripheral surface of each second molding section 52 has a curved shape corresponding to the first curved section 31 of the core 1 shown in FIG. 2. The first corner 531 has a curvature radius ranging between 0.2 mm and 1.5 mm inclusive. With the first corner 531 having a curved shape, the first curved section 31 is formed at the corner between each tooth 3 and the back yoke 2.

Furthermore, as shown in FIG. 7, an outer peripheral corner 532 and an inner peripheral corner 533 of the step 53 both have a curved shape corresponding to the outer curved section 23 and the inner curved section 24 of the back yoke 2 shown in FIG. 2. The outer peripheral corner 532 and the inner peripheral corner 533 each have a curvature radius ranging between, for example, 0.5 mm and 5.0 mm inclusive. With the outer peripheral corner 532 and the inner peripheral corner 533 having a curved shape, the outer curved section 23 and the inner curved section 24 are formed at the corners of the outer peripheral edge and the inner peripheral edge of the back yoke 2.

When the core 1 is to be molded by pressing the upper puncher 70 against the raw powder, the second flat surface 22 of the back yoke 2 pressed by the end surface of the upper puncher 70 becomes a compressed surface, as shown in FIG. 10. Moreover, the surface of the step 53 and the end surface of each punching section 82 of the lower puncher 80 become pressure-receiving surfaces. In this case, the pressure acting on the surface of the step 53 is received by the outer peripheral corner 532 and the inner peripheral corner 533, so that bending stress is likely to concentrate on the outer peripheral corner 532 and the inner peripheral corner 533. With the curvature radius of each of the outer peripheral corner 532 and the inner peripheral corner 533 being 0.5 mm or larger, stress concentration can be alleviated. Thus, breakage of the die 50 can be suppressed.

On the other hand, when the molded core 1 is to be removed from the mold 5, the die 50 is lowered while only the end surfaces of the teeth 3 are supported by the punching sections 82, whereby the core 1 is removed from the die 50 while being relatively pushed upward. In this case, the outer peripheral surface of the back yoke 2 slides against the inner peripheral surface of the first molding section 51. Moreover, the inner peripheral surface of the back yoke 2 slides against the outer peripheral surface of the core rod 60. Therefore, the outer peripheral region 27 and the inner peripheral region 28 of the back yoke 2 respectively bulging outward and inward in the radial direction from the teeth 3 shown in FIG. 3 receive bending stress. Since the difference between the outer radius R2o of the back yoke 2 and the outer radius R3o of the teeth 3 shown in FIG. 1 is 6.0 mm or smaller, the dimension of the outer peripheral region 27 in the radial direction is reduced. Moreover, since the difference between the inner radius R3i of the teeth 3 and the inner radius R2i of the back yoke 2 shown in FIG. 1 is 7.0 mm or smaller, the dimension of the inner peripheral region 28 in the radial direction is reduced. Thus, when the core 1 is to be removed from the mold 5, the bending stress acting on the outer peripheral region 27 and the inner peripheral region 28 can be reduced, thereby suppressing deformation of the outer peripheral region 27 and the inner peripheral region 28.

With one of, or preferably, both of the difference between the outer radius R2o of the back yoke 2 and the outer radius R3o of the teeth 3 and the difference between the inner radius R3i of the teeth 3 and the inner radius R2i of the back yoke 2 being 4.0 mm or smaller, more specifically, 3.0 mm or smaller, the area of the second flat surface 22 can be reduced. When the core 1 is to be molded by using the mold 5, the area of the compressed surface pressed by the end surface of the upper puncher 70 decreases with decreasing area of the second flat surface 22, as shown in FIG. 10. Since higher molding pressure can be applied owing to the smaller compression area, the core 1 can be increased in density. The difference between the outer radius R2o of the back yoke 2 and the outer radius R3o of the teeth 3 and the difference between the inner radius R3i of the teeth 3 and the inner radius R2i of the back yoke 2 may be equal to each other or may be different from each other. In FIGS. 1 and 2, the difference between the outer radius R2o of the back yoke 2 and the outer radius R3o of the teeth 3 is larger than the difference between the inner radius R3i of the teeth 3 and the inner radius R2i of the back yoke 2. When the core 1 is to be molded, the inner peripheral side of the back yoke 2 and the teeth 3 experiences less spring-back as well as less friction against the mold 5. Therefore, the load acting on the root of each tooth 3 is smaller at the inner peripheral side. Thus, the difference between the inner radius R3i of the teeth 3 and the inner radius R2i of the back yoke 2 can be made larger than the difference between the outer radius R2o of the back yoke 2 and the outer radius R3o of the teeth 3.

[Stator]

Figure 11:
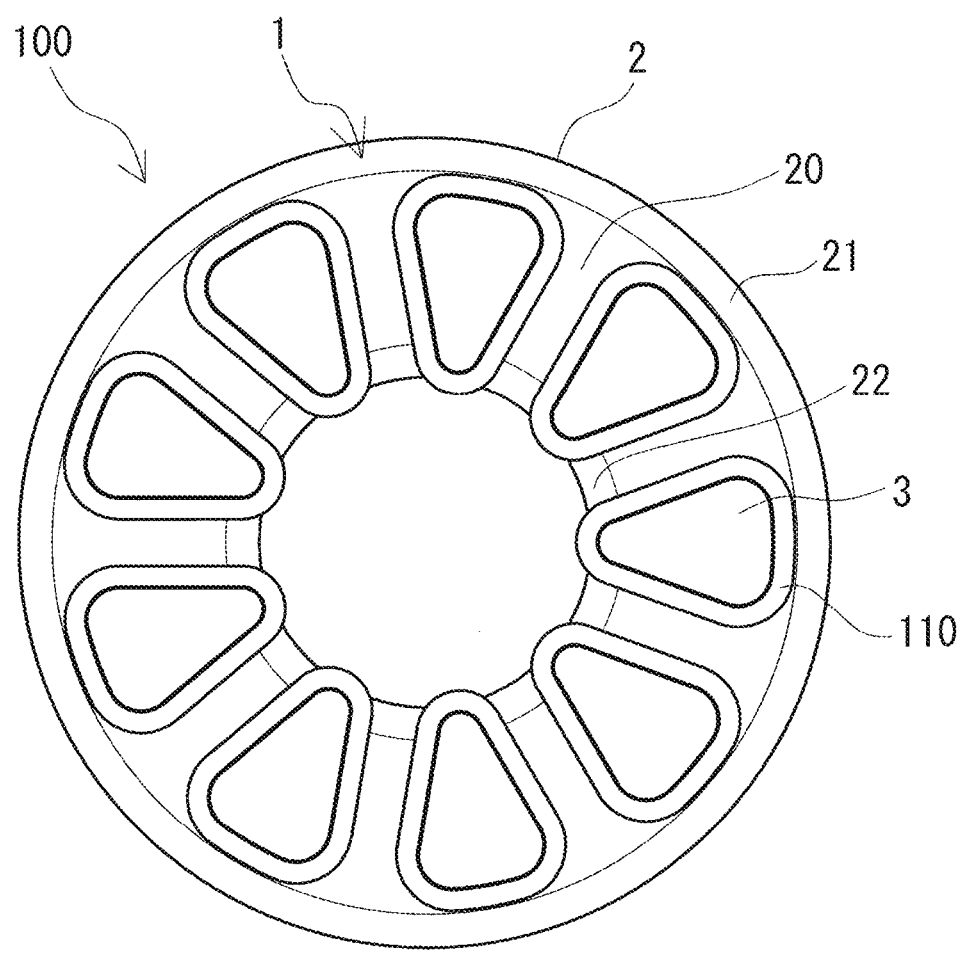
FIG. 11 is a schematic top view of a stator according to an embodiment.

A stator 100 according to an embodiment will now be described with reference to FIG. 11. The stator 100 is used in an axial-gap rotating electric device. The stator 100 includes a core 1 and a coil 110 disposed around each tooth 3 of the core 1. Each coil 110 is constituted by winding a wire around the corresponding tooth 3.

[Rotating Electric Device]

A rotating electric device 300 according to an embodiment will now be described with reference to FIG. 12. The rotating electric device 300 may be a motor or an electric generator. The rotating electric device 300 includes the rotor 200 and the stator 100. The rotating electric device 300 is an axial-gap rotating electric device in which the rotor 200 and the stator 100 are disposed facing each other in a rotation-axis direction.

The stator 100 and the rotor 200 are accommodated in a cylindrical casing 310. Circular-disk-shaped plates 320 are attached to the opposite ends of the casing 310. Each plate 320 has a through-hole at the center thereof, such that a rotating shaft 330 extends through the casing 310.

(Rotor)

The rotor 200 includes a plurality of tabular magnets 220 and a ring-shaped support plate 210 that supports these magnets 220. Each magnet 220 has a planar shape that substantially corresponds to the end surface of each tooth 3. If the shape of the end surface of each tooth 3 is triangular, the planar shape of each magnet 220 is, for example, triangular or trapezoidal. The support plate 210 is fixed to the rotating shaft 330 and rotates together with the rotating shaft 330. The magnets 220 are embedded in the support plate 210. The magnets 220 may be fixed to the support plate 210 by using an adhesive. The magnets 220 are disposed at equal intervals in the circumferential direction of the rotating shaft 330. Furthermore, the magnets 220 are magnetized in the axial direction of the rotating shaft 330. The magnets 220 neighboring each other in the circumferential direction are magnetized in opposite directions from each other.

(Stator)

The stator 100 is disposed such that the end surfaces of the teeth 3 face the magnets 220 of the rotor 200. The stator 100 is secured to the casing 310 by engaging the outer peripheral surface of the back yoke 2 of the core 1 with the inner peripheral surface of the casing 310. In this example, the outer peripheral surface of the back yoke 2 is provided with the linear section 25, so that the core 1 constituting the stator 100 can be readily secured to the casing 310. Moreover, an annular bearing 340 that rotatably supports the rotating shaft 330 is disposed at the inner peripheral side of the back yoke 2.

[Modifications]

In the core 1, at least one of the outer peripheral surface and the inner peripheral surface of the back yoke 2 may have a protrusion or a recess. An example where the outer peripheral surface of the back yoke 2 has a protrusion 41 or a recess 42 will now be described with reference to FIGS. 13A and 13B or FIGS. 14A and 14B.

Figure 13A:
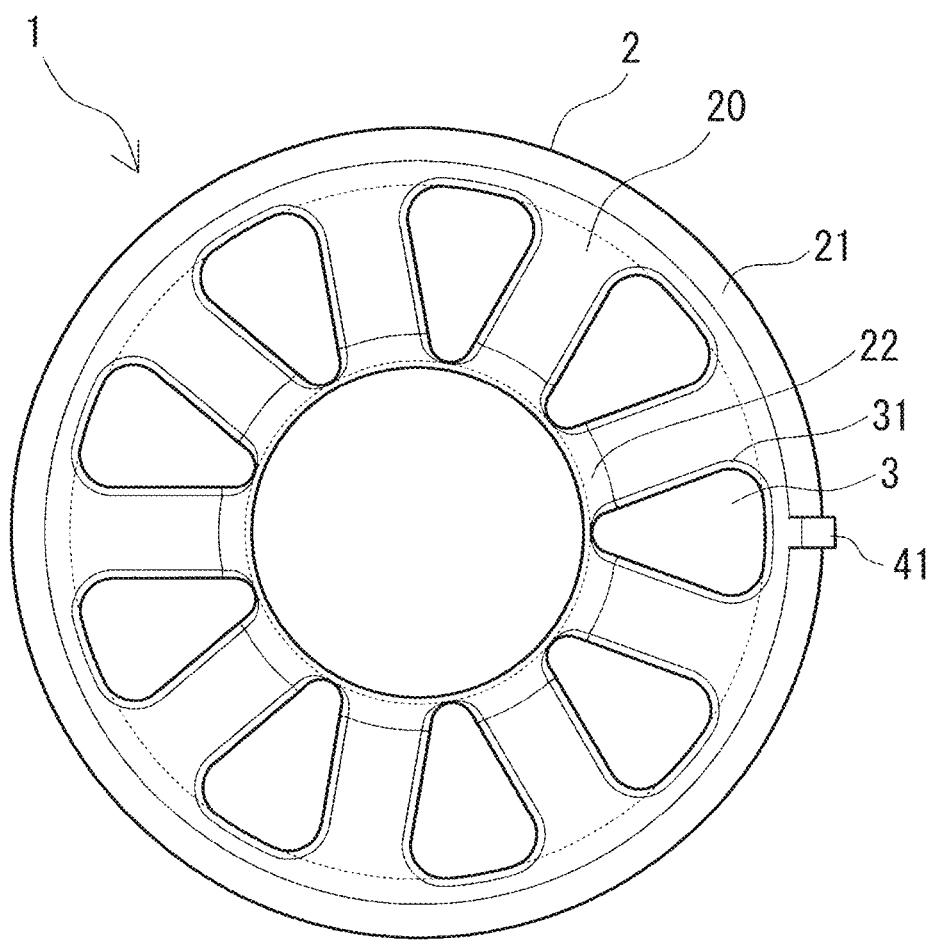
FIG. 13A is a schematic top view illustrating an example of a core according to a modification.

The core 1 shown in FIG. 13A is provided with the protrusion 41 that protrudes in the radial direction from the outer peripheral surface of the back yoke 2. The protrusion 41 is partially provided at the outer peripheral surface of the back yoke 2. As an alternative to the example shown in FIG. 13A in which a single protrusion 41 is provided, a plurality of protrusions 41 may be provided. In this example, the protrusion 41 has a rectangular shape in plan view of the core 1. The shape of the protrusion 41 is not limited to a rectangular shape and may alternatively be, for example, a semicircular shape, a triangular shape, or a trapezoidal shape.

Figure 13B:
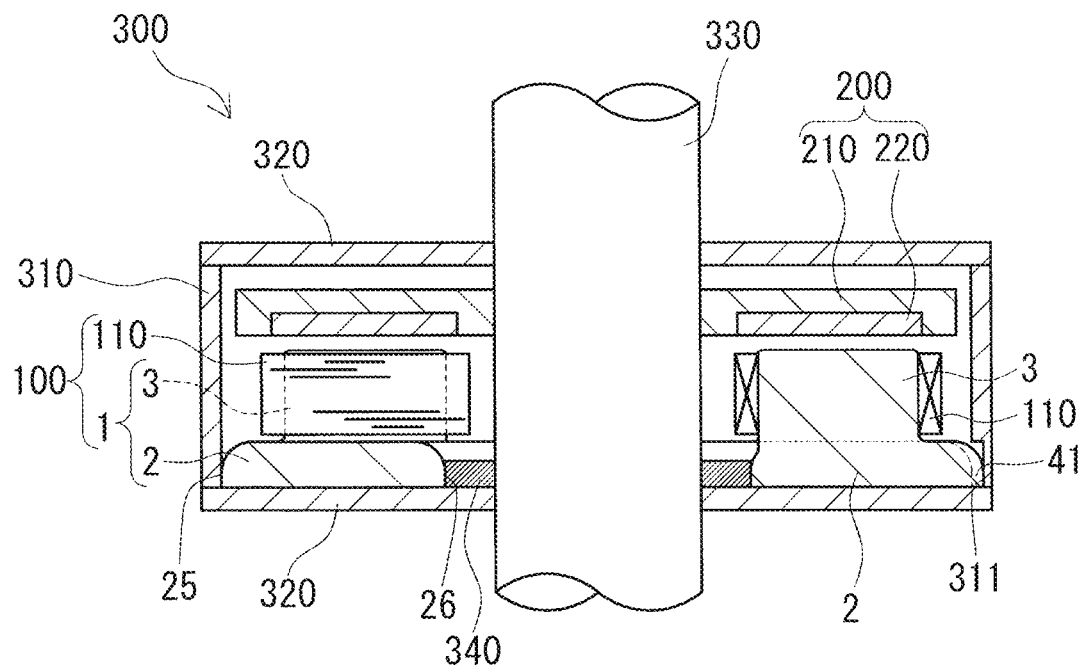
FIG. 13B is a schematic cross-sectional view of a rotating electric device that uses the core shown in FIG. 13A.

In a case where the rotating electric device 300 is to be constituted by using the core 1 shown in FIG. 13A, a recess 311 corresponding to the protrusion 41 on the outer peripheral surface of the back yoke 2 is provided in the inner peripheral surface of the casing 310, as shown in FIG. 13B. By engaging the protrusion 41 and the recess 311 with each other, the core 1 of the stator 100 can be positioned relative to the casing 310.

Figure 14A:
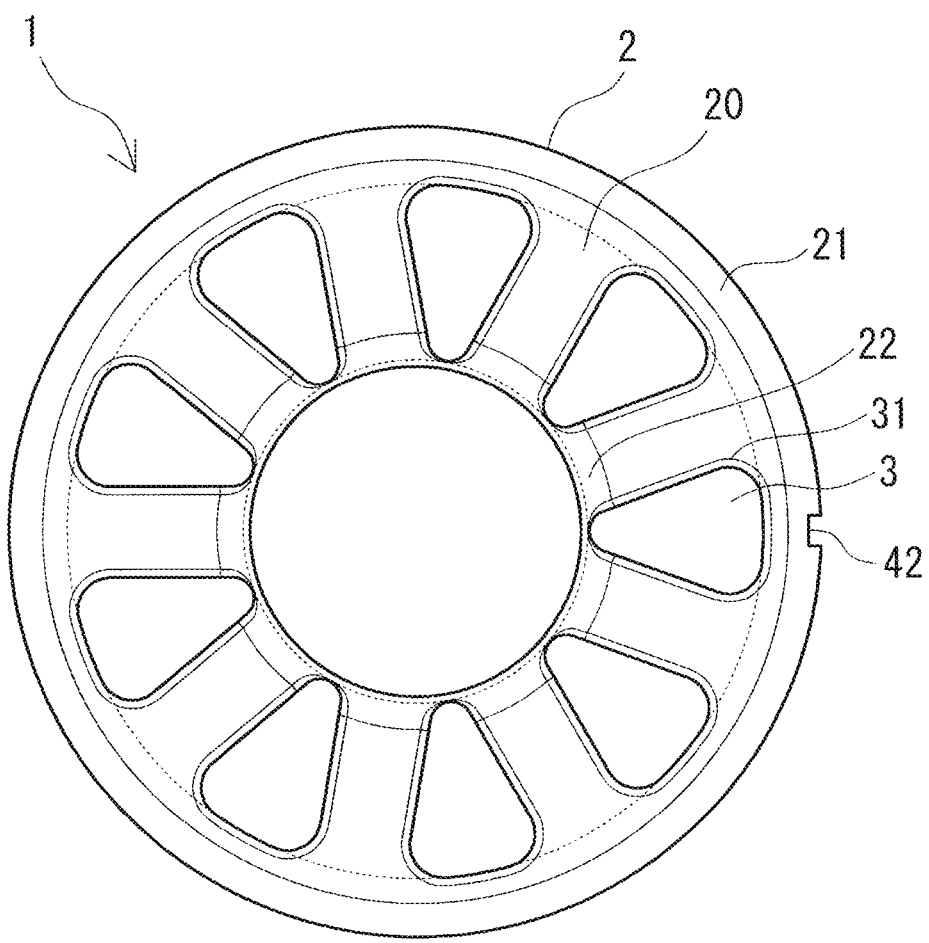
FIG. 14A is a schematic top view illustrating another example of a core according to a modification.

The core 1 shown in FIG. 14A is provided with the recess 42 that is recessed in the radial direction in the outer peripheral surface of the back yoke 2. The recess 42 is partially provided in the outer peripheral surface of the back yoke 2. As an alternative to the example shown in FIG. 14A in which a single recess 42 is provided, a plurality of recesses 42 may be provided. In this example, the recess 42 has a rectangular shape in plan view of the core 1. The shape of the recess 42 is not limited to a rectangular shape and may alternatively be, for example, a semicircular shape, a triangular shape, or a trapezoidal shape.

Figure 14B:
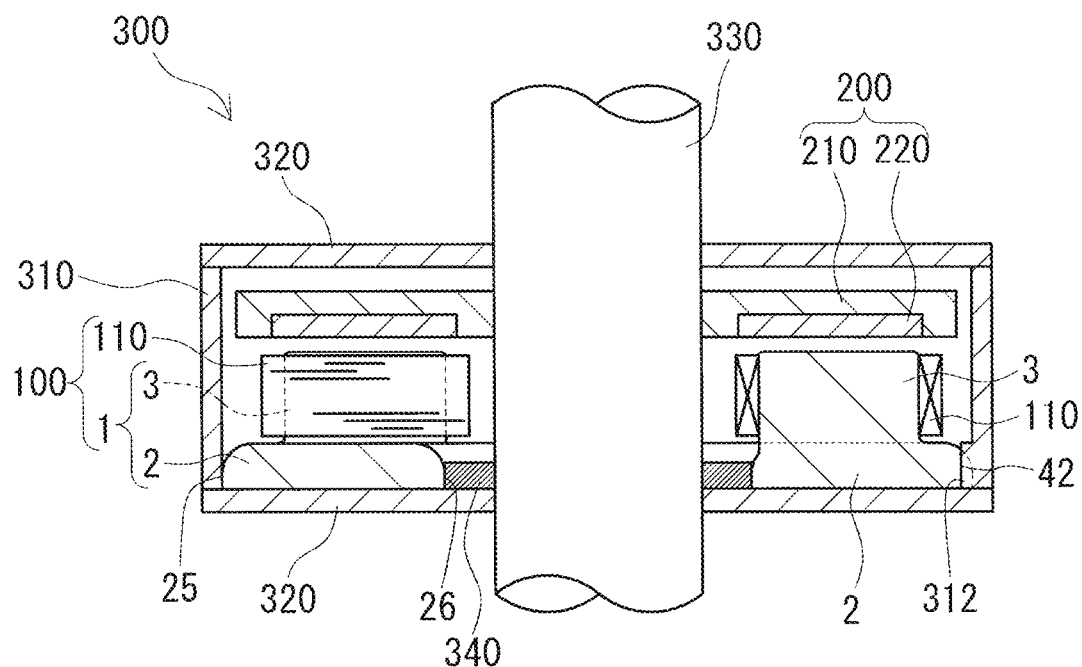
FIG. 14B is a schematic cross-sectional view of a rotating electric device that uses the core shown in FIG. 14A.

In a case where the rotating electric device 300 is to be constituted by using the core 1 shown in FIG. 14A, a protrusion 312 corresponding to the recess 42 in the outer peripheral surface of the back yoke 2 is provided at the inner peripheral surface of the casing 310, as shown in FIG. 14B. By engaging the recess 42 and the protrusion 312 with each other, the core 1 of the stator 100 can be positioned relative to the casing 310.

As an alternative to the example in FIGS. 13A and 13B or FIGS. 14A and 14B in which the outer peripheral surface of the back yoke 2 has the protrusion 41 or the recess 42, the inner peripheral surface of the back yoke 2 may partially be provided with a protrusion or a recess. The number of protrusions or recesses is not particularly limited so long as at least one protrusion or recess is provided. As an alternative to being rectangular in plan view of the core 1, the protrusion or the recess may be, for example, semicircular, triangular, or trapezoidal.

For example, a bus bar (not shown) is sometimes provided within the back yoke 2. In that case, the inner peripheral surface of the back yoke 2 is provided with a protrusion or a recess, and the outer peripheral surface of the bus bar is provided with a recess or a protrusion corresponding to the aforementioned protrusion or recess. By engaging the protrusion and the recess with each other, the bus bar can be positioned relative to the core 1.

By providing at least one of the outer peripheral surface and the inner peripheral surface of the back yoke 2 with a protrusion or a recess, as described above, the protrusion or the recess can be used for positioning. Furthermore, when the protrusion or the recess is to be used for positioning, the shape of the protrusion or the recess in plan view of the core 1 preferably has at least one linear segment. A linear segment is a segment constituted of a straight line in the outline of the protrusion or the recess in plan view of the core 1. With the shape of the protrusion or the recess having a linear segment, the positioning accuracy can be enhanced.

Advantageous Effects of Embodiments

The core 1, the stator 100, and the rotating electric device 300 according to the above-described embodiments exhibit the following advantageous effects.

The core 1 has a first curved section with a curvature radius of 0.2 mm or larger at the corner between each tooth 3 and the back yoke 2, so that a leakage flux occurring at the corner between the tooth 3 and the back yoke 2 can be reduced. Thus, a loss caused by a leakage flux can be suppressed. Furthermore, with the curvature radius of the first curved section 31 being 1.5 mm or smaller, a decrease in the number of turns in each coil 110 can be suppressed. Accordingly, a decrease in the torque of the rotating electric device 300 can be suppressed.

The stator 100 equipped with the core 1 has excellent magnetic properties. The rotating electric device 300 equipped with the stator 100 has excellent efficiency.

Test Example 1

A core having the same configuration as the core 1 described in the embodiment is fabricated and evaluated. In test example 1, a plurality of cores with the first curved sections 31 having different curvature radii are prepared. The cores are referred to as sample No. 1-0 to sample No. 1-6. The coils 110 are formed by winding wires around the individual teeth 3 of each prepared core 1, thereby fabricating the stator 100. Then, the axial-gap rotating electric device 300 is constituted by using the fabricated stator 100. This rotating electric device 300 functions as a motor.

Each wire used is a copper wire with a wire diameter of 1.5 mm. The number of turns in each coil with respect to each sample is indicated in Table 1.

By using electromagnetic-field analysis software, a magnetic-flux density distribution of each core when electric current is applied to each coil is analyzed, so that a maximum magnetic-flux density at the root of each tooth is determined. The electromagnetic-field analysis software used is "JMAG" created by JSOL Corporation. Table 1 indicates the maximum magnetic-flux density at the root of each tooth with respect to each sample. An iron loss of the core and the torque of the motor are determined in accordance with an electromagnetic field analysis, and the results obtained are also indicated in Table 1.

TABLE 1

| SAMPLE | CURVATURE RADIUS OF FIRST CURVED SECTION (mm) | NUMBER OF TURNS IN COIL | MAXIMUM MAGNETIC-FLUX DENSITY (T) | TORQUE (Nm) | IRON LOSS (W) |
|---|---|---|---|---|---|
| No. 1-0 | 0 | 22 | 2.12 | 0.098 | 6.9 |
| No. 1-1 | 0.2 | 22 | 2.09 | 0.100 | 6.6 |
| No. 1-2 | 0.3 | 22 | 2.06 | 0.102 | 6.2 |
| No. 1-3 | 0.5 | 22 | 2.00 | 0.103 | 5.8 |
| No. 1-4 | 1.0 | 22 | 1.95 | 0.104 | 5.6 |
| No. 1-5 | 1.5 | 22 | 1.85 | 0.103 | 5.3 |
| No. 1-6 | 2.0 | 21 | 1.65 | 0.089 | 4.2 |

It is clear from Table 1 that, in sample No. 1-1 to sample No. 1-6 in which the curvature radius of the first curved section is 0.2 mm or larger, the iron loss is small, as compared with sample No. 1-0 in which the curvature radius is 0 mm. In sample No. 1-0 in which the curvature radius is 0 mm, it is conceivable that the iron loss caused by a leakage flux is large due to the magnetic flux taking a shortcut between the peripheral surface of each tooth and the first flat surface of the back yoke. In contrast, in sample No. 1-1 to sample No. 1-6, it is conceivable that the iron loss caused by a leakage flux is small since the leakage flux taking the shortcut is reduced due to the curvature radius being 0.2 mm or larger.

It is clear from the comparisons among sample No. 1-1 to sample No. 1-6 that the iron loss can be suppressed as the curvature radius of the first curved section increases. However, in sample No. 1-6 in which the curvature radius is 2.0 mm, it is clear that the torque has decreased, as compared with sample No. 1-1 to sample No. 1-5 in which the curvature radius is 1.5 mm or smaller. This is because, in sample No. 1-6, the number of turns in the coil is reduced due to the large curvature radius, as compared with sample No. 1-1 to sample No. 1-5.

It can be concluded from above that the curvature radius of the first curved section preferably ranges between 0.2 mm and 1.5 mm inclusive.

Test Example 2

A stress distribution acting on the die 50 when the core 1 described in the embodiment is molded by using the mold 5 is analyzed in accordance with CAE (computer-aided engineering). Then, from the result of the CAE-based stress analysis, maximum stress occurring at the outer peripheral corner 532 of the step 53 in the die 50 is determined. In test example 2, the curvature radius of the outer peripheral corner 532 is varied, and the maximum stress in each case is determined. The results obtained are indicated in Table 2.

For the stress analysis, structure analysis software, specifically, "NX Nastran" created by Siemens AG is used. The analysis conditions are set as follows. The molding pressure is set to 980 MPa. With regard to the physical property values of the die 50, the Young's modulus is set to 206,000 MPa, and the Poisson's ratio is set to 0.3. The back yoke 2 of the core 1 to be molded is set to have an outer radius R2$o$ of 25 mm, an inner radius R2$i$ of 10 mm, and a thickness T2 of 3.0 mm.

TABLE 2

| CURVATURE RADIUS OF OUTER PERIPHERAL CORNER (mm) | MAXIMUM STRESS (MPa) |
|---|---|
| 0.3 | 2503 |
| 0.5 | 1846 |
| 1.0 | 1221 |
| 3.0 | 773 |
| 4.0 | 465 |

It is clear from Table 2 that the maximum stress at the outer peripheral corner when the core is being molded can be reduced as the curvature radius of the outer peripheral corner increases. In particular, it is clear that, when the curvature radius of the outer peripheral corner is 0.5 mm or larger, the maximum stress occurring at the outer peripheral corner can be reduced to 2000 MPa or lower.

Because the curved surface at the outer peripheral corner of the step in the die is a part for molding the outer curved section of the back yoke in the core, it can be concluded that the curvature radius of the outer curved section is preferably 0.5 mm or larger.

Test Example 3

In test example 3, maximum stress occurring at the inner peripheral corner 533 of the step 53 in the die 50 when the core is being molded is determined in accordance with a CAE-based stress analysis similar to that in text example 2. The results obtained are indicated in Table 3. The analysis conditions are the same as those in text example 2.

TABLE 3

| CURVATURE RADIUS OF INNER PERIPHERAL CORNER (mm) | MAXIMUM STRESS (MPa) |
| --- | --- |
| 0.3 | 1824 |
| 0.5 | 1493 |
| 1.0 | 933 |
| 3.0 | 681 |
| 4.0 | 433 |

It is clear from Table 3 that the maximum stress at the inner peripheral corner when the core is being molded can be reduced as the curvature radius of the inner peripheral corner increases. In particular, it is clear that, when the curvature radius of the inner peripheral corner is 0.5 mm or larger, the maximum stress occurring at the inner peripheral corner can be reduced to 2000 MPa or lower, more specifically, 1500 MPa or lower.

Because the curved surface at the inner peripheral corner of the step in the die is a part for molding the inner curved section of the back yoke in the core, it can be concluded that the curvature radius of the inner curved section is preferably 0.5 mm or larger. Furthermore, it is clear from the results in Table 2 and Table 3 that the maximum stress occurring when the core is being molded tends to be higher at the outer peripheral corner of the step in the die than at the inner peripheral corner. Therefore, it can be concluded that the curvature radius of the outer peripheral corner is preferably larger than the curvature radius of the inner peripheral corner, that is, the curvature radius of the outer curved section is preferably larger than the curvature radius of the inner curved section. Moreover, in view of the fact that the magnetic flux flowing through the back yoke is likely to selectively pass through the inner peripheral side, it can be concluded that the curvature radius of the outer curved section is preferably larger than the curvature radius of the inner curved section from the standpoint of motor performance.

The following additional items will further be disclosed in relation to the above-described embodiments of the present disclosure.

[Additional Item 1]

A core used in an axial-gap rotating electric device, the core comprising:
  an annular back yoke; and
  a plurality of teeth protruding in an axial direction from a first flat surface of the back yoke,
  wherein the plurality of teeth are provided on the first flat surface at intervals in a circumferential direction,
  wherein the back yoke and the teeth are constituted of an integrally-molded powder compact,
  wherein a first curved section that connects a peripheral surface of each tooth and the first flat surface of the back yoke is provided at a corner between the tooth and the back yoke, and
  wherein the first curved section has a curvature radius ranging between 0.2 mm and 1.5 mm inclusive.

The core according to additional item 1 has the first curved section at the corner between each tooth and the back yoke, so that a leakage flux occurring at the corner between the tooth and the back yoke can be reduced. Accordingly, the core according to additional item 1 can enhance the magnetic properties. With the curvature radius of the first curved section being 0.2 mm or larger, a leakage flux can be effectively reduced. Moreover, with the curvature radius of the first curved section being 1.5 mm or smaller, a space for a coil disposed around each tooth can be readily ensured, and the space factor of the coil can be improved. Therefore, a decrease in the number of turns in the coil can be suppressed, whereby a decrease in the torque of the rotating electric device can be suppressed.

[Additional Item 2]

The core according to additional item 1, further comprising:
  an outer curved section that connects the first flat surface and an outer peripheral surface of the back yoke; and
  an inner curved section that connects the first flat surface and an inner peripheral surface of the back yoke,
  wherein the outer curved section and the inner curved section each have a curvature radius ranging between 0.5 mm and 5.0 mm inclusive.

The core formed of a molded powder compact is molded by compressing soft-magnetic powder with a mold. When the core is to be molded by using the mold, bending stress is likely to concentrate on the mold, particularly, on a corner of a die, sometimes causing a crack to form at the corner of the mold. In additional item 2, the outer curved section and the inner curved section of the back yoke each have a curvature radius of 0.5 mm or larger, so that stress concentration at the corner of the mold can be alleviated. Thus, breakage of the mold can be suppressed in the above-described configuration. When the curvature radius of each of the outer curved section and the inner curved section increases, linear sections of the outer peripheral surface and the inner peripheral surface of the back yoke become shorter relative to the thickness of the back yoke. With the outer curved section and the inner curved section of the back yoke each having a curvature radius of 5.0 mm or smaller, sufficiently long linear sections of the outer peripheral surface and the inner peripheral surface of the back yoke can be readily ensured.

[Additional Item 3]

The core according to additional item 1,
  wherein the molded powder compact is constituted of a group of a plurality of coated soft-magnetic particles each having an insulation coating over a surface of the soft-magnetic particle, and
  wherein an average particle diameter of the soft-magnetic particles ranges between 20 μm and 300 μm inclusive.

The average particle diameter of the soft-magnetic particles constituting the molded powder compact is dependent on the average particle diameter of soft-magnetic powder contained in raw powder. With the average particle diameter of the soft-magnetic particles ranging between 20 μm and 300 μm inclusive, a fine and highly-dense molded powder compact can be readily obtained.

The average particle diameter of the soft-magnetic particles in the molded powder compact can be determined as follows.

A freely-chosen cross section of the molded powder compact is observed with a microscope, such as a scanning electron microscope (SEM) or an optical microscope. All soft-magnetic particles existing within the observation visual field are extracted, and the area of each particle is measured. The diameter of a circle having an area equal to the area of each particle is calculated, and an average value thereof is set as an average particle diameter of the soft-magnetic particles. For example, the size of the observation visual field is set such that it includes 50 or more soft-magnetic particles. The extraction of the soft-magnetic particles, the measurement of the area, and the calculation of the isometric equivalent circle diameter may be performed by using image analysis software.

[Additional Item 4]

The core according to additional item 1,
wherein the molded powder compact is constituted of a group of a plurality of coated soft-magnetic particles each having an insulation coating over a surface of the soft-magnetic particle, and
wherein an average particle diameter of the soft-magnetic particles ranges between 40 μm and 250 μm inclusive.

With the average particle diameter of the soft-magnetic particles ranging between 40 μm and 250 μm inclusive, a finer and more highly-dense molded powder compact can be readily obtained.

[Additional Item 5]

The core according to additional item 1, wherein a relative density of the molded powder compact is 93% or higher.

With the relative density of the molded powder compact being 93% or higher, the molded powder compact has a high density. With the molded powder compact having an increased density, the mechanical strength and the magnetic properties of the core can be enhanced.

| Reference Signs List | | |
|---|---|---|
| 1 core | | |
| 2 back yoke | | |
| 21 first flat surface | 22 second flat surface | |
| 23 outer curved section | 24 inner curved section | |
| 25, 26 linear section | | |
| 27 outer peripheral region | 28 inner peripheral region | |
| 3 tooth | | |
| 31 first curved section | | |
| 41 protrusion | 42 recess | |
| 5 mold | | |
| 50 die | | |
| 51 first molding section | 52 second molding section | |
| 53 step | | |
| 531 first corner | | |
| 532 outer peripheral corner | 533 inner peripheral corner | |
| 60 core rod | | |
| 70 upper puncher | 80 lower puncher | 82 punching section |
| 100 stator | | |
| 110 coil | 200 rotor | |
| 210 support plate | 220 magnet | |
| 300 rotating electric device | | |
| 310 casing | | |
| 311 recess | 312 protrusion | |
| 320 plate | | |
| 330 rotating shaft | 340 bearing | |
| T2 thickness | | |
| R2o, R3o outer radius | | |
| R3i, R2i inner radius | | |
| H3 height position | | |

The invention claimed is:

1. A core used in an axial-gap rotating electric device, the core comprising:
an annular back yoke; and
a plurality of teeth protruding in an axial direction that is perpendicular to a first flat surface of the back yoke,
wherein the plurality of teeth are provided on the first flat surface at intervals in a circumferential direction,
wherein the back yoke and the teeth are constituted of an integrally-molded powder compact,
wherein a first curved section that connects a peripheral surface of each tooth and the first flat surface of the back yoke is provided at a corner between the tooth and the back yoke, and
wherein the first curved section has a curvature radius ranging between 0.2 mm and 1.5 mm inclusive.

2. The core according to claim 1, further comprising:
an outer curved section that connects the first flat surface and an outer peripheral surface of the back yoke; and
an inner curved section that connects the first flat surface and an inner peripheral surface of the back yoke,
wherein the outer curved section and the inner curved section each have a curvature radius of 0.5 mm or larger.

3. The core according to claim 2,
wherein the curvature radius of the outer curved section and the curvature radius of the inner curved section are different from each other.

4. The core according to claim 1,
wherein at least one of an outer peripheral surface and an inner peripheral surface of the back yoke has a linear section extending in the axial direction, and
wherein the linear section has a length that is 15% or more of a thickness of the back yoke.

5. The core according to claim 1,
wherein a difference between a dimension, in a radial direction, from an axial center to an outer peripheral surface of the back yoke and a dimension, in the radial direction, from the axial center of the back yoke to a surface located at an outer peripheral side of the teeth is 6.0 mm or smaller.

6. The core according to claim 1,
wherein a difference between a dimension, in a radial direction, from an axial center of the back yoke to a surface located at an inner peripheral side of the teeth and a dimension, in the radial direction, from the axial center to an inner peripheral surface of the back yoke is 7.0 mm or smaller.

7. The core according to claim 1, further comprising:
a protrusion or a recess partially provided in at least one of an outer peripheral surface and an inner peripheral surface of the back yoke, the protrusion protruding in a radial direction, the recess being recessed in the radial direction.

8. The core according to claim 1,
wherein the molded powder compact is constituted of a group of a plurality of coated soft-magnetic particles each having an insulation coating over a surface of the soft-magnetic particle, and
wherein the soft-magnetic particles are iron-based particles composed of pure iron or at least one type of iron-based alloy selected from an Fe—Si-based alloy, an Fe—Al-based alloy, an Fe—Cr—Al-based alloy, and an Fe—Cr—Si-based alloy.

9. The core according to claim 8,
wherein the insulation coating includes a phosphate coating.

10. The core according to claim 1,
wherein a relative density of the molded powder compact is 90% or higher.

11. A stator in an axial-gap rotating electric device, the stator comprising:
the core according to claim 1; and
a coil disposed around each tooth of the core.

12. A axial-gap rotating electric device comprising a rotor and the stator according to claim 11 and in which the rotor and the stator are disposed facing each other in an axial direction.

13. A core used in an axial-gap rotating electric device, the core comprising:
an annular back yoke; and
a plurality of teeth protruding in an axial direction that is perpendicular to a first flat surface of the back yoke, wherein the plurality of teeth are provided on the first flat surface at intervals in a circumferential direction, wherein the back yoke and the teeth are constituted of an integrally-molded powder compact, wherein a first curved section that connects a peripheral surface of each tooth and the first flat surface of the back yoke is provided at a corner between the tooth and the back yoke, wherein the first curved section has a curvature radius ranging between 0.2 mm and 1.5 mm inclusive, wherein the core further comprises:

an outer curved section that connects the first flat surface and an outer peripheral surface of the back yoke; and an inner curved section that connects the first flat surface and an inner peripheral surface of the back yoke, wherein the outer curved section and the inner curved section each have a curvature radius of 0.5 mm or larger, wherein at least one of the outer peripheral surface and the inner peripheral surface of the back yoke has a linear section extending in the axial direction, and wherein the linear section has a length that is 15% or more of a thickness of the back yoke.

* * * * *